United States Patent
Johnson et al.

(10) Patent No.: US 12,460,457 B2
(45) Date of Patent: Nov. 4, 2025

(54) SASH TILT BOLT AND CHECKRAIL BRACKET SYSTEMS FOR COASTAL IMPACT RESISTANT FENESTRATIONS

(71) Applicant: Andersen Corporation, Bayport, MN (US)

(72) Inventors: Craig Michael Johnson, North Oaks, MN (US); Jared Asa Shanholtzer, Saint Paul Park, MN (US); Christopher Michael Hanson, Fridley, MN (US); Allen Anthony DaRonco, Somerset, WI (US)

(73) Assignee: Andersen Corporation, Bayport, MN (US)

( * ) Notice: Subject to any disclaimer, the term of this patent is extended or adjusted under 35 U.S.C. 154(b) by 481 days.

(21) Appl. No.: 17/941,696

(22) Filed: Sep. 9, 2022

(65) Prior Publication Data
US 2023/0151654 A1    May 18, 2023

Related U.S. Application Data

(60) Provisional application No. 63/242,876, filed on Sep. 10, 2021.

(51) Int. Cl.
*E05C 9/18*   (2006.01)
*E05C 9/04*   (2006.01)
(Continued)

(52) U.S. Cl.
CPC .............. *E05C 9/1808* (2013.01); *E05C 9/04* (2013.01); *E06B 5/10* (2013.01); *E06B 3/22* (2013.01); *E06B 3/96* (2013.01)

(58) Field of Classification Search
CPC . E06B 3/22; E06B 3/96; E06B 3/5063; E06B 5/10; E05C 9/04; E05C 9/1808
See application file for complete search history.

(56) References Cited

U.S. PATENT DOCUMENTS 2,573,223 A   10/1951  Jordan et al.
2,791,456 A    5/1957  Roehl et al.
(Continued)

FOREIGN PATENT DOCUMENTS

DE   202005021045   2/2007
DE   202012104587   12/2012
(Continued)

OTHER PUBLICATIONS

"Non-Final Office Action," for U.S. Appl. No. 17/941,698 mailed Aug. 3, 2023 (14 pages).
(Continued)

*Primary Examiner* — Christine T Cajilig
(74) *Attorney, Agent, or Firm* — Pauly, DeVries Smith & Deffner LLC

(57) ABSTRACT

Embodiments herein relate to fenestrations, such as windows and doors, exhibiting coastal impact performance. In a first aspect, an impact-resistant fenestration unit can be included having a frame and a bottom sash. The bottom sash can have a bottom rail, a check rail, and opposed stiles and can be configured to pivot inward away from the frame assembly such that the check rail moves away from the frame assembly. A first side bracket can define a cavity to receive a portion of a bolt from a sash tilt bolt assembly. The first side bracket can be mounted on one of the two opposed side jambs at a height corresponding to a position of the check rail when the bottom sash can be in a closed position. The bolt can include a metal inner support member and a polymeric overmold portion. Other embodiments are also included herein.

19 Claims, 19 Drawing Sheets

(51) Int. Cl.
*E06B 3/22* (2006.01)
*E06B 3/96* (2006.01)
*E06B 5/10* (2006.01)

(56) References Cited

U.S. PATENT DOCUMENTS

| | | | |
|---|---|---|---|
| 3,712,482 | A | 1/1973 | Bondowski |
| 4,956,940 | A | 9/1990 | Touton |
| 4,995,213 | A | 2/1991 | Bezubic |
| 5,301,467 | A * | 4/1994 | Schmidt .............. E05D 13/1207 49/176 |
| 6,565,133 | B1 | 5/2003 | Timothy |
| 6,802,156 | B2 * | 10/2004 | Sherrett .............. E06B 3/44 52/204.5 |
| 7,258,757 | B2 * | 8/2007 | Huang .............. B32B 17/10055 156/107 |
| 7,607,262 | B2 | 10/2009 | Pettit et al. |
| 7,614,188 | B2 | 11/2009 | Hetherington et al. |
| 7,827,734 | B2 | 11/2010 | Cox et al. |
| 8,596,017 | B2 | 12/2013 | Emanuel |
| 8,857,129 | B2 | 10/2014 | Beranek |
| 8,955,255 | B2 * | 2/2015 | DeBoer .............. E05C 1/12 49/176 |
| 9,631,415 | B2 | 4/2017 | Eisenbarth et al. |
| 9,657,503 | B2 | 5/2017 | Hollermann et al. |
| 9,718,253 | B2 | 8/2017 | Farmer et al. |
| 10,093,051 | B2 | 10/2018 | Eggert et al. |
| 10,094,164 | B2 | 10/2018 | Massey |
| 10,119,325 | B2 | 11/2018 | Barton et al. |
| 10,174,544 | B2 | 1/2019 | Kellum |
| 10,180,015 | B1 * | 1/2019 | Grainger .............. E05D 15/22 |
| 10,538,948 | B1 * | 1/2020 | Johnson .............. E05B 63/0056 |
| 10,550,257 | B2 | 2/2020 | Peterson et al. |
| 10,927,578 | B2 | 2/2021 | Bent |
| 10,968,674 | B1 * | 4/2021 | Johnson .............. E05D 15/22 |
| 11,118,376 | B1 * | 9/2021 | Liang .............. E06B 3/5063 |
| 11,326,391 | B2 | 5/2022 | Luvison |
| 11,499,362 | B2 * | 11/2022 | Hay, III .............. E06B 3/4415 |
| 11,939,811 | B2 | 3/2024 | Johnson et al. |
| 2002/0000724 | A1 * | 1/2002 | Kalargeros .............. E05B 85/26 292/195 |
| 2002/0044823 | A1 | 4/2002 | Sosa |
| 2005/0016067 | A1 * | 1/2005 | Pettit .............. E05C 9/041 49/185 |
| 2006/0010792 | A1 | 1/2006 | Biggers |
| 2006/0192391 | A1 | 8/2006 | Pettit et al. |
| 2009/0311449 | A1 | 12/2009 | Fehlmann et al. |
| 2010/0313478 | A1 | 12/2010 | Montz |
| 2013/0127182 | A1 * | 5/2013 | Bendel .............. E05B 77/38 292/200 |
| 2014/0326126 | A1 | 11/2014 | Hay et al. |
| 2014/0373464 | A1 * | 12/2014 | Benevenga .............. E06B 3/44 49/449 |
| 2015/0121788 | A1 | 5/2015 | Kim |
| 2017/0240738 | A1 | 8/2017 | Ehrlichmann et al. |
| 2020/0332593 | A1 | 10/2020 | Ribberink |
| 2022/0010611 | A1 | 1/2022 | Rietz et al. |
| 2023/0151676 | A1 | 5/2023 | Johnson et al. |
| 2023/0151677 | A1 | 5/2023 | Johnson |
| 2023/0295980 | A1 | 9/2023 | Steademan et al. |

FOREIGN PATENT DOCUMENTS

| | | |
|---|---|---|
| DE | 102011055037 | 5/2013 |
| DE | 102020126640 | 4/2022 |
| EP | 1270864 | 1/2003 |
| EP | 1550786 | 7/2005 |
| EP | 2202378 | 6/2010 |
| EP | 2469003 | 6/2012 |
| EP | 2589739 | 5/2013 |
| EP | 3511509 | 7/2019 |
| FR | 2960900 | 12/2011 |
| FR | 3055650 | 3/2018 |
| GB | 2086458 | 5/1982 |
| GB | 2416561 | 2/2006 |
| GB | 2442733 | 4/2008 |
| WO | 0058589 | 10/2000 |
| WO | 2014102558 | 7/2014 |
| WO | 2017221222 | 12/2017 |
| WO | 2018053510 | 3/2018 |

OTHER PUBLICATIONS

"Notice of Allowance," for U.S. Appl. No. 17/941,698 mailed Nov. 22, 2023 (10 pages).

"Response to Non-Final Office Action," for U.S. Appl. No. 17/941,698 mailed Nov. 2, 2023 (10 pages).

"Non-Final Office Action," for U.S. Appl. No. 17/941,698 mailed May 20, 2025 (26 pages).

"Response to Non-Final Rejection," mailed on May 20, 2025, for U.S. Appl. No. 17/941,692, submitted via Patent Center on Aug. 7, 2025, 10 pages.

* cited by examiner

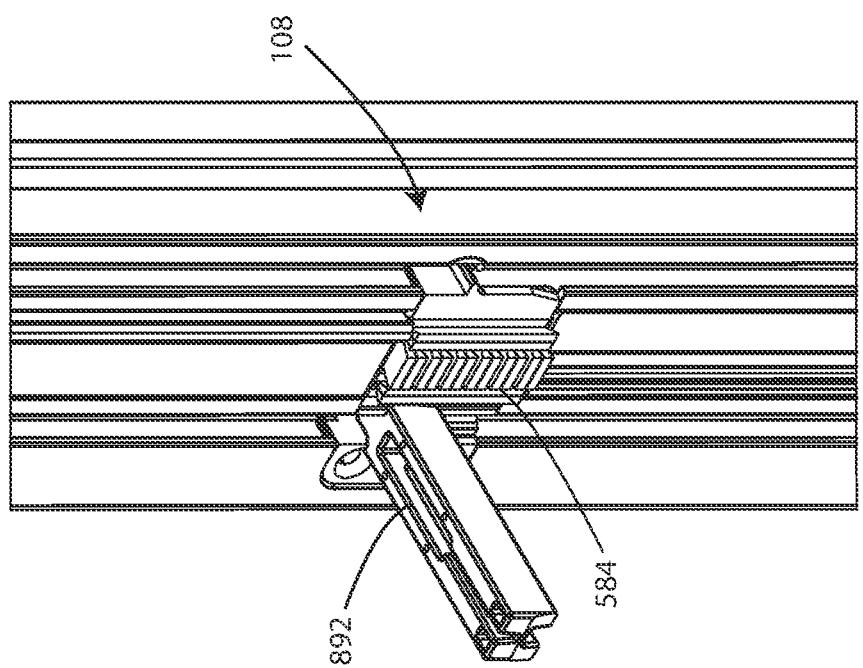

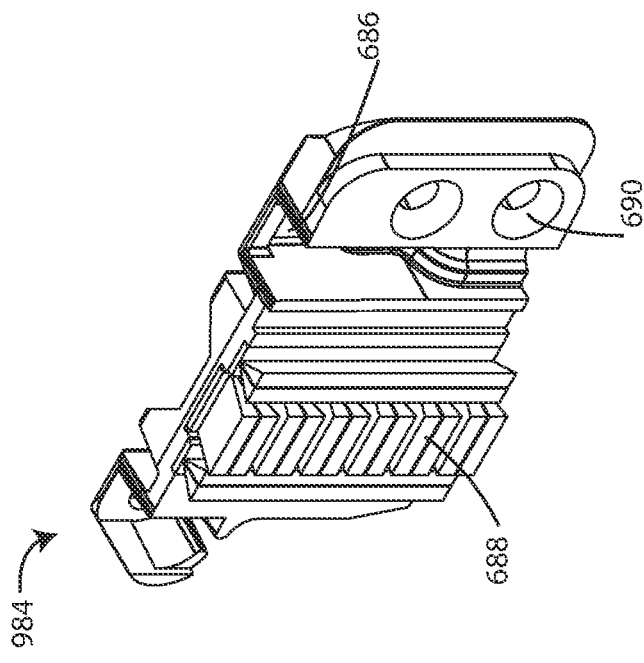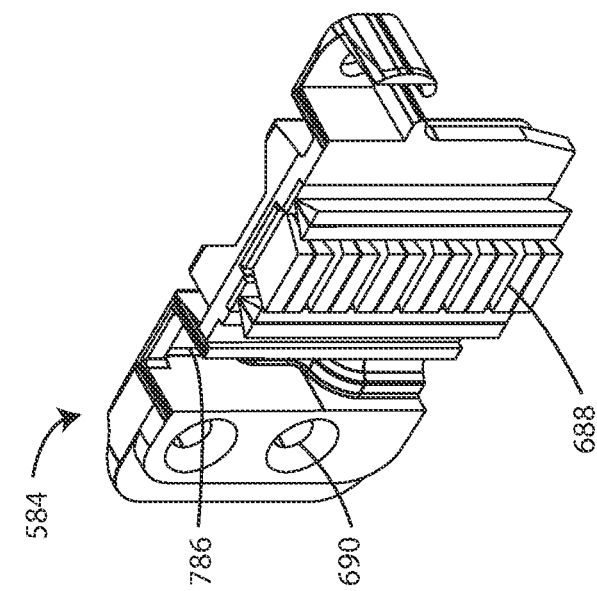
FIG. 9

SASH TILT BOLT AND CHECKRAIL BRACKET SYSTEMS FOR COASTAL IMPACT RESISTANT FENESTRATIONS

This application claims the benefit of U.S. Provisional Application No. 63/242,876, filed Sep. 10, 2021, the content of which is herein incorporated by reference in its entirety.

FIELD

Embodiments herein relate to fenestrations, such as windows and doors, exhibiting coastal impact performance.

BACKGROUND

Tropical storms and hurricanes can include very high wind speeds that can result in substantial amounts of objects being picked up by the wind and becoming dangerous wind driven projectiles. Such projectiles can cause glass breakage and other damage to buildings and components thereof such as windows and doors. To prevent such damage and the potential for injuries associated with the same, building codes and standards for certain coastal areas have been established to require that fenestrations meet certain requirements for high wind loads and impact resistance.

Modern fenestrations including windows and doors are recognized by architects and discerning homeowners as a positive source of aesthetics and style for the modern home while also providing remarkable energy efficiency. However, the engineering requirements associated with achieving new coastal building code requirements function as a design constraint often resulting in fenestrations without positive aesthetics and without high levels of other types of fenestration performance such as insulation and energy efficiency.

SUMMARY

Embodiments herein relate to fenestrations, such as windows and doors, exhibiting coastal impact performance. In a first aspect, an impact-resistant fenestration unit can be included having a frame assembly including a sill, a head jamb, and two opposed side jambs. A bottom sash can be included having a bottom rail, a check rail, and opposed stiles. The bottom sash can be configured to pivot inward away from the frame assembly such that the check rail moves away from the frame assembly. The bottom sash can also be configured to move within the frame between a closed position and an open position. A first sash tilt bolt assembly can be included having a bolt. A second sash tilt bolt assembly can also be included having a bolt. The first and second sash tilt bolt assemblies can be disposed on opposite sides of the check rail. A first side bracket can define a cavity to receive a portion of the bolt of the first sash tilt bolt assembly. The first side bracket can be mounted on one of the two opposed side jambs at a height corresponding to a position of the check rail when the bottom sash can be in a closed position. A second side bracket can define a cavity to receive a portion of the bolt of the second sash tilt bolt assembly. The second side bracket can be mounted on the other of the two opposed side jambs at a height corresponding to the position of the check rail when the bottom sash can be in a closed position. The first and second bolts include a metal inner support member and a polymeric overmold portion.

In a second aspect, in addition to one or more of the preceding or following aspects, or in the alternative to some aspects, the first and second side brackets can be anchored in place each using a fastener that penetrates through the frame assembly into an area outside the frame assembly.

In a third aspect, in addition to one or more of the preceding or following aspects, or in the alternative to some aspects, the first side bracket can be at least partially embedded within a surface of one of the two opposed side jambs and the second side bracket can be at least partially embedded within a surface of the other of the two opposed side jambs.

In a fourth aspect, in addition to one or more of the preceding or following aspects, or in the alternative to some aspects, the first side bracket can be mounted flush with a surface of one of the two opposed side jambs and the second side bracket can be mounted flush with a surface of the other of the two opposed side jambs.

In a fifth aspect, in addition to one or more of the preceding or following aspects, or in the alternative to some aspects, the bottom sash can include a glass subassembly and a retention member, the glass subassembly can include an interior laminate pane and an exterior pane, the retention member engaging at least a portion of the interior laminate pane.

In a sixth aspect, in addition to one or more of the preceding or following aspects, or in the alternative to some aspects, the two opposed side jambs each can include a channel extending along a vertical axis of each side jamb.

In a seventh aspect, in addition to one or more of the preceding or following aspects, or in the alternative to some aspects, the first side bracket can be mounted such that the cavity of the first side bracket can be flush with the channel of one of the two opposed side jambs, and the second side bracket can be mounted such that the cavity of the second side bracket can be flush with the channel of the other of the two opposed side jambs.

In an eighth aspect, in addition to one or more of the preceding or following aspects, or in the alternative to some aspects, the cavity of the first side bracket forms a portion of the channel of one of the two opposed side jambs, and the cavity of the second side bracket forms a portion of the channel of the other of the two opposed side jambs.

In a ninth aspect, in addition to one or more of the preceding or following aspects, or in the alternative to some aspects, a first end of the bottom rail can be configured to slide along the channel of one of the two opposed side jambs, and a second end of the bottom rail can be configured to slide along the channel of the other of the two opposed side jambs.

In a tenth aspect, in addition to one or more of the preceding or following aspects, or in the alternative to some aspects, the channel can be disposed towards an interior side of the impact-resistant fenestration unit.

In an eleventh aspect, in addition to one or more of the preceding or following aspects, or in the alternative to some aspects, the two opposed side jambs each can include a second channel disposed towards an exterior side of the impact-resistant fenestration unit, wherein the first side bracket can be fastened into the exterior channel of one of the two opposed side jambs with a first balancer screw, and the second side bracket fastened into the exterior channel of the other of the two opposed side jambs with a second balancer screw.

In a twelfth aspect, in addition to one or more of the preceding or following aspects, or in the alternative to some aspects, the polymeric overmold portion of the bolt includes a polyamide.

In a thirteenth aspect, in addition to one or more of the preceding or following aspects, or in the alternative to some aspects, the metal inner support member of the bolt includes a zinc containing metal.

In a fourteenth aspect, in addition to one or more of the preceding or following aspects, or in the alternative to some aspects, the first and second bolts can be configured to move between an open position and a locked position.

In a fifteenth aspect, in addition to one or more of the preceding or following aspects, or in the alternative to some aspects, the bolts can be configured to move between the open position and the locked position by actuation of a window lock.

In a sixteenth aspect, in addition to one or more of the preceding or following aspects, or in the alternative to some aspects, the bolts can be configured to be configured to move between the open position and the locked position by a manual adjustment.

In a seventeenth aspect, in addition to one or more of the preceding or following aspects, or in the alternative to some aspects, the first and second bolts can be spring loaded.

In an eighteenth aspect, in addition to one or more of the preceding or following aspects, or in the alternative to some aspects, the first bolt includes a first spring configured to bias the first bolt such that a portion of the first bolt projects outwards from the housing of the first sash tilt bolt assembly, and wherein the second bolt includes a second spring configured to bias the second bolt such that a portion of the second bolt projects outwards from the housing of the second sash tilt bolt assembly.

In a nineteenth aspect, in addition to one or more of the preceding or following aspects, or in the alternative to some aspects, the first and second bolts can be configured to be actuated by a window lock, wherein actuating the window lock retracts the first bolt into the housing of the first sash tilt bolt assembly and the second bolt into the housing of the second sash tilt bolt assembly.

In a twentieth aspect, in addition to one or more of the preceding or following aspects, or in the alternative to some aspects, the first and second brackets can include a zinc alloy.

In a twenty-first aspect, in addition to one or more of the preceding or following aspects, or in the alternative to some aspects, wherein side jam includes a polymer and the first and second brackets include metal.

In a twenty-second aspect, in addition to one or more of the preceding or following aspects, or in the alternative to some aspects, the first and second brackets each can include a backer fin configured to seal the impact-resistant fenestration unit.

In a twenty-third aspect, in addition to one or more of the preceding or following aspects, or in the alternative to some aspects, the first and second brackets each can include an aperture to receive a fastener, wherein the aperture of the first bracket can be at a vertical offset from the aperture of the second bracket.

In a twenty-fourth aspect, in addition to one or more of the preceding or following aspects, or in the alternative to some aspects, the fastener of the first and second brackets each have a diameter, and the vertical offset can be greater than the diameter.

In a twenty-fifth aspect, in addition to one or more of the preceding or following aspects, or in the alternative to some aspects, the first and second brackets each can include a first aperture and a second aperture for receiving a first fastener and a second fastener, wherein the first aperture of the first bracket can be at a vertical offset from the first aperture of the second bracket, and wherein the second aperture of the first bracket can be at a vertical offset from the second aperture of the second bracket.

In a twenty-sixth aspect, in addition to one or more of the preceding or following aspects, or in the alternative to some aspects, the portion of the bolt of the first sash tilt bolt assembly and the portion of the bolt of the second sash tilt bolt assembly received by the cavity of the first and second brackets includes metal.

In a twenty-seventh aspect, in addition to one or more of the preceding or following aspects, or in the alternative to some aspects, the metal inner support member defines an inner channel of the first and second bolts.

In a twenty-eighth aspect, in addition to one or more of the preceding or following aspects, or in the alternative to some aspects, the bottom rail, check rail, and two opposed stiles formed from a lineal extrusion can include a thermoplastic resin.

In a twenty-ninth aspect, in addition to one or more of the preceding or following aspects, or in the alternative to some aspects, the portion of thermoplastic resin can include at least 50 percent by weight of the total weight of materials forming the lineal extrusion.

In a thirtieth aspect, in addition to one or more of the preceding or following aspects, or in the alternative to some aspects, the portion of thermoplastic resin can include at least 90 percent by weight of the total weight of materials forming the lineal extrusion.

In a thirty-first aspect, in addition to one or more of the preceding or following aspects, or in the alternative to some aspects, the thermoplastic resin can include polyvinylchloride.

In a thirty-second aspect, in addition to one or more of the preceding or following aspects, or in the alternative to some aspects, wherein at least one of the bottom rail, check rail, and two opposed stiles includes a portion can include a composite including a thermoplastic resin and at least one of particles and glass fibers.

In a thirty-third aspect, in addition to one or more of the preceding or following aspects, or in the alternative to some aspects, wherein at least one of the bottom rail, check rail, and two opposed stiles includes a portion can include a composite including a thermoplastic resin, an impact modifier, and at least one of particles and glass fibers.

In a thirty-fourth aspect, in addition to one or more of the preceding or following aspects, or in the alternative to some aspects, wherein at least one of the bottom rail, check rail, and two opposed stiles includes a portion can include a thermoplastic resin without glass fibers and a portion can include a composite including a thermoplastic resin and glass fibers.

In a thirty-fifth aspect, in addition to one or more of the preceding or following aspects, or in the alternative to some aspects, the fenestration unit includes a window.

In a thirty-sixth aspect, in addition to one or more of the preceding or following aspects, or in the alternative to some aspects, the fenestration unit includes a double-hung window.

In a thirty-seventh aspect, in addition to one or more of the preceding or following aspects, or in the alternative to some aspects, wherein at least one of the first stile, the second stile, the bottom rail, and the check rail includes an exterior side lineal extrusion and an interior side lineal extrusion.

In a thirty-eighth aspect, in addition to one or more of the preceding or following aspects, or in the alternative to some aspects, the exterior side lineal extrusion and an interior side lineal extrusion separated from one another with at least one of foam tape and an adhesive.

In a thirty-ninth aspect, in addition to one or more of the preceding or following aspects, or in the alternative to some aspects, the fenestration unit further can include a balancer disposed within the bottom sash.

In a fortieth aspect, in addition to one or more of the preceding or following aspects, or in the alternative to some aspects, the first stile of the two opposed stiles and the bottom rail intersect appearing as a mortise and tenon joint, the first stile of the two opposed stiles and the check rail intersect appearing as a mortise and tenon joint, the second stile of the two opposed stiles and the bottom rail intersect appearing as a mortise and tenon joint, and the second stile of the two opposed stiles and the check rail intersect appearing as a mortise and tenon joint.

In a forty-first aspect, in addition to one or more of the preceding or following aspects, or in the alternative to some aspects, at least one of the first stile, the second stile, the bottom rail, and the check rail includes a thermal break between interior and exterior sides thereof.

In a forty-second aspect, in addition to one or more of the preceding or following aspects, or in the alternative to some aspects, at least one of the first stile, the second stile, the bottom rail, and the check rail includes a structure can include a first material interrupted with a second material in cross-section to create a thermal break.

In a forty-third aspect, in addition to one or more of the preceding or following aspects, or in the alternative to some aspects, at least one of the first stile, the second stile, the bottom rail, and the check rail includes an exterior side lineal extrusion and an interior side lineal extrusion and a thermal break between adjacent portions of the exterior lineal extrusion and the interior lineal extrusion.

In a forty-fourth aspect, in addition to one or more of the preceding or following aspects, or in the alternative to some aspects, the impact-resistant fenestration unit exhibits impact resistance properties satisfying ASTM E1996-17 missile level A.

In a forty-fifth aspect, in addition to one or more of the preceding or following aspects, or in the alternative to some aspects, the impact-resistant fenestration unit exhibits impact resistance properties satisfying ASTM E1996-17 missile level D.

In a forty-sixth aspect, in addition to one or more of the preceding or following aspects, or in the alternative to some aspects, the impact-resistant fenestration unit exhibits HVHZ/Wind Zone 4 impact resistance and cyclical pressure properties.

In a forty-seventh aspect, in addition to one or more of the preceding or following aspects, or in the alternative to some aspects, the impact-resistant fenestration unit meets TAS 201 and 203 requirements.

In a forty-eighth aspect, in addition to one or more of the preceding or following aspects, or in the alternative to some aspects, the impact-resistant fenestration unit exhibits a U factor of less than or equal to 0.40 BTU/h*ft2*° F.

In a forty-ninth aspect, in addition to one or more of the preceding or following aspects, or in the alternative to some aspects, the impact-resistant fenestration unit exhibits a U factor of less than or equal to 0.30 BTU/h*ft2*° F.

In a fiftieth aspect, in addition to one or more of the preceding or following aspects, or in the alternative to some aspects, the first stile lacks a metal material interconnecting an exterior window side of the first stile with an interior window side of the first stile.

In a fifty-first aspect, in addition to one or more of the preceding or following aspects, or in the alternative to some aspects, the bottom sash can include a transparent central area and the top sash can include a transparent central area, wherein the transparent areas cover a surface area of at least 55% of the overall area defined by an outer perimeter of the frame assembly.

In a fifty-second aspect, in addition to one or more of the preceding or following aspects, or in the alternative to some aspects, metal makes up less than 30 percent by weight of the impact-resistant fenestration unit excluding hardware and fasteners.

In a fifty-third aspect, in addition to one or more of the preceding or following aspects, or in the alternative to some aspects, the check rail of the bottom sash can include a surface defining an exterior window side top corner and an interior window side top corner, wherein a radius of curvature of the interior corner can be greater than 0.2 inches.

In a fifty-fourth aspect, in addition to one or more of the preceding or following aspects, or in the alternative to some aspects, the fenestration unit further can include a flat portion in between the exterior top corner and the interior top corner, the flat portion having a width of less than 1.5 inches.

In a fifty-fifth aspect, in addition to one or more of the preceding or following aspects, or in the alternative to some aspects, the fenestration unit can be further configured to maintain impact-resistant properties independent of an external profile shape of extrusions forming the bottom rail, check rail, and two opposed stiles.

In a fifty-sixth aspect, an impact-resistant fenestration unit can be included having a frame assembly can include a sill, a head jamb, and two opposed side jambs. A bottom sash can include a bottom rail, a check rail, and two opposed stiles. The bottom sash can be configured to move within the frame between a closed position where a bottom portion of the bottom sash engages a top of the sill and an open position where the bottom portion of the bottom sash can be separated from the top of the sill. The bottom sash forming a first lower corner, a second lower corner, a first upper corner, and a second upper corner, wherein the first stile of the two opposed stiles and the bottom rail intersect appearing as a mortise and tenon joint and the impact-resistant fenestration unit exhibits impact resistance properties satisfying ASTM E1996-17 missile level D and a U factor of less than or equal to 0.40 BTU/h*ft2*° F.

In a fifty-seventh aspect, an impact-resistant fenestration unit can be included having a frame assembly can include a sill, a head jamb, and two opposed side jambs. A bottom sash can include a bottom rail, a check rail, and two opposed stiles. The bottom sash can be configured to move within the frame between a closed position where a bottom portion of the bottom sash engages a top of the sill and an open position where the bottom portion of the bottom sash can be separated from the top of the sill. The bottom sash can form a first lower corner, a second lower corner, a first upper corner, and a second upper corner. Metal can make up less than 30 percent by weight of the impact-resistant fenestration unit excluding hardware and fasteners. The impact-resistant fenestration unit can exhibit impact resistance properties satisfying ASTM E1996-17 missile level D and a U factor of less than or equal to 0.40 BTU/h*ft2*° F.

In a fifty-eighth aspect, an impact-resistant fenestration unit can be included having a frame assembly can include a sill, a head jamb, and two opposed side jambs. A bottom sash can include a bottom rail, a check rail, and two opposed stiles. The bottom sash can be configured to move within the frame between a closed position where a bottom portion of the bottom sash engages a top of the sill and an open position where the bottom portion of the bottom sash can be separated from the top of the sill. The bottom sash can form a first lower corner, a second lower corner, a first upper corner, and a second upper corner. The check rail of the bottom sash can include a surface defining an exterior window side top corner and an interior window side top corner. A radius of curvature of the interior corner can be greater than 0.2 inches. The impact-resistant fenestration unit exhibits impact resistance properties satisfying ASTM E1996-17 missile level D and a U factor of less than or equal to 0.40 BTU/h*ft2*° F.

In a fifty-ninth aspect, an impact-resistant fenestration unit can be included having a frame assembly can include a sill, a head jamb, and two opposed side jambs. The bottom sash can include a bottom rail, a check rail, and two opposed stiles. The bottom sash can be configured to move within the frame between a closed position where a bottom portion of the bottom sash engages a top of the sill and an open position where the bottom portion of the bottom sash can be separated from the top of the sill. The bottom sash can form a first lower corner, a second lower corner, a first upper corner, and a second upper corner. The bottom sash can include a transparent central area and the top sash can include a transparent central area, wherein the transparent areas cover a surface area of at least 55% of the overall area defined by an outer perimeter of the frame assembly. The impact-resistant fenestration unit can exhibit impact resistance properties satisfying ASTM E1996-17 missile level D and exhibit a U factor of less than or equal to 0.40 BTU/h*ft2*° F.

In a sixtieth aspect, a sash tilt bolt and receiving bracket system for an impact-resistant fenestration unit can be included having a sash tilt bolt assembly. The sash tilt bolt assembly can include a bolt disposed within a housing. The bolt can include a metal inner support member and a polymeric overmold portion. A side bracket can define a cavity to receive a portion of the spring-loaded bolt of the sash tilt bolt assembly. The spring-loaded bolt can be configured to move between an open and a locked position, wherein an exterior portion of the spring-loaded bolt engages with the cavity of the side bracket in the locked position.

In a sixty-first aspect, a method of reinforcing an impact-resistant fenestration unit can be included. The method can include mounting a first sash tilt bolt assembly to a first end of a check rail of a bottom sash. The method can also include mounting a second sash tilt bolt assembly to a second end of a check rail of a bottom sash. The method can also include mounting a first side bracket to a first side jamb at a height corresponding to the position of the check rail when the bottom sash can be in a closed position. The method can also include mounting a second side bracket to a second side jamb at a height corresponding to the position of the check rail when the bottom sash can be in a closed position. The first and second sash tilt bolt assemblies each include a housing and a spring-loaded bolt disposed therein. The spring-loaded bolts can each include a metal inner support member and a polymeric overmold portion.

In a sixty-second aspect, in addition to one or more of the preceding or following aspects, or in the alternative to some aspects, the method can further include inserting a fastener through the first side bracket and through a frame assembly of the impact-resistant fenestration unit and into a rough opening surrounding the impact-resistant fenestration unit and inserting a fastener through the second side bracket and through the frame assembly of the impact-resistant fenestration unit and into the rough opening surrounding the impact-resistant fenestration unit.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which:

FIG. 8 is a perspective view of a side bracket mounted onto a side jamb in accordance with various embodiments herein in accordance with various embodiments herein.

FIG. 9 is a perspective view of a pair of side brackets in accordance with various embodiments herein in accordance with various embodiments herein.

Figure 1:
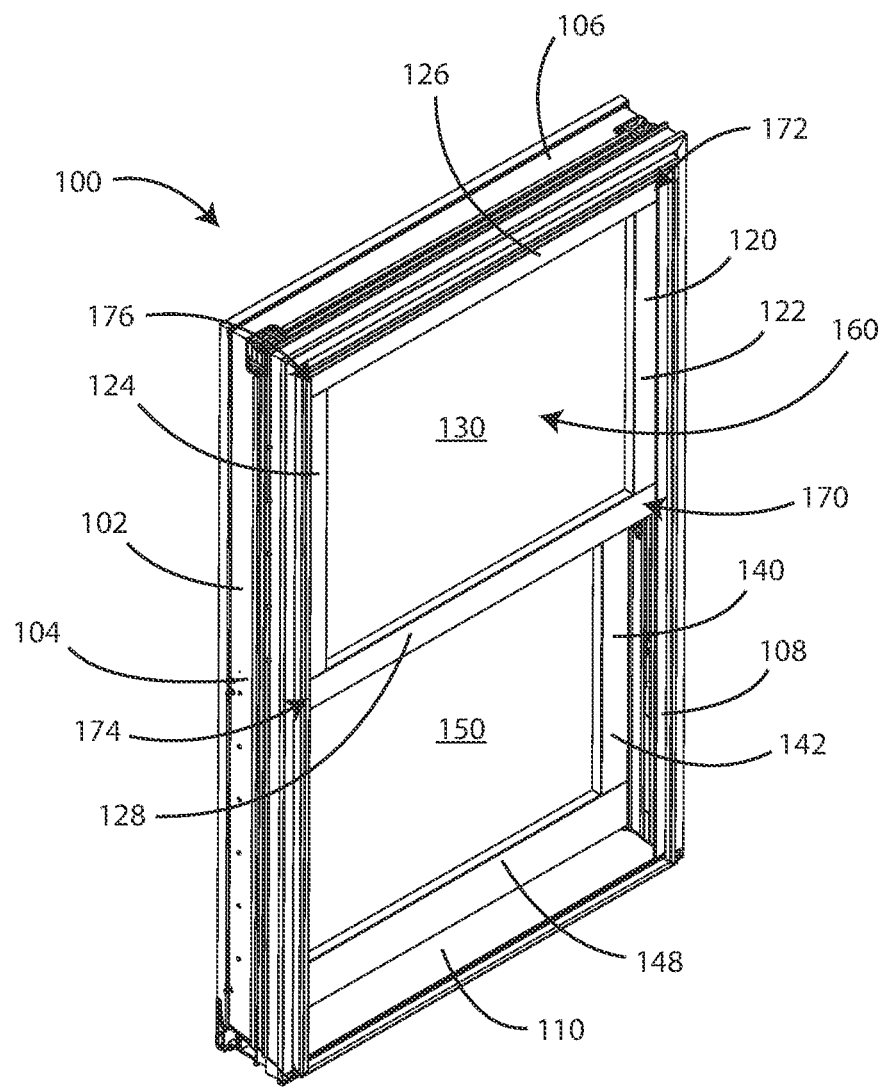
FIG. 1 is a perspective view of the exterior side of an impact-resistant fenestration unit in accordance with various embodiments herein.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

Embodiments herein include fenestrations, such as windows and doors, that provide robust impact resistance while also minimizing the visibility of features required to achieve such robust impact resistance thereby promoting enhanced aesthetics. Fenestrations herein can also be formed of certain materials and physically configured to promote other measures of fenestration performance such as insulation and energy efficiency.

Various impact-resistant fenestration units herein are specifically tilt sash models, wherein a sash, such the bottom sash, can pivot about the bottom rail such that the top rail tilts or moves toward the interior side (such as in toward the interior of a building). While tilt sash models offer advantages such as making it easier for individuals to clean the exterior side of the sash(es), they can also make it more difficult to achieve desirable levels of impact resistance. However, embodiments herein can include tilt sash fenestration units that still meet impact resistance requirements.

Various impact-resistant fenestration units herein are formed using hollow lineal extrusions for rails, stiles, jambs, sills, etc. instead of solid materials such as solid wood components. While hollow lineal extrusions offer advantages in terms of efficient material usage, energy efficiency, and the like, such hollow components diminish the ability to anchor fasteners as well as transfer force. However, embodiments herein can include fenestration units formed from hollow lineal extrusions that still meet impact resistance requirements.

In various embodiments herein, check rail brackets and/or two-piece check rail bolts can be used to reinforce an interface between a check rail tilt bolt assembly and the side jamb of a frame of a window assembly to prevent damage to the fenestration assembly from an object impact as well as more efficiently transfer a load resulting from the object impact from the check rail, to the frame, and onto a rough opening surrounding the fenestration unit.

In an embodiment, an impact-resistant fenestration unit is included with an outer frame assembly and a bottom sash. The outer frame assembly can include a sill, a head jamb, and two opposed side jambs. The bottom sash can include a bottom rail, a check rail, and two opposed stiles. The bottom sash can be configured to move within the outer frame between a closed position where a bottom portion of the bottom sash engages the top of the sill and an open position where the bottom portion of the bottom sash is separated from the top of the sill. The impact-resistant fenestration unit can include a first sash tilt bolt assembly having a bolt disposed within a housing and a second sash tilt bolt assembly having a bolt disposed within a housing. The first and second sash tilt bolt assemblies can be disposed on opposite sides of the check rail. The impact-resistant fenestration unit can include a first side bracket defining a cavity to receive a portion of the bolt of the first sash tilt bolt assembly. The first side bracket is configured to be mounted on one of the two opposed side jambs at a height corresponding to a position of the check rail when the bottom sash is in a closed position. The impact-resistant fenestration unit can include a second side bracket defining a cavity to receive a portion of the bolt of the second sash tilt bolt assembly. The second side bracket is configured to be mounted on the other of the two opposed side jambs at a height corresponding to the position of the check rail when the bottom sash is in a closed position.

Referring now to FIG. 1, a perspective view of the exterior side 160 of an impact-resistant fenestration unit 100 is shown in accordance with various embodiments herein. The impact-resistant fenestration unit 100 includes a frame assembly 102. The frame assembly 102 includes a first side jamb 104, a head jamb 106, a second side jamb 108, and a sill 110. In various embodiments the first side jamb 104, head jamb 106, second side jamb 108, and sill 110 can be lineal extrusions formed of materials described in greater detail below. In the example, of FIG. 1, the impact-resistant fenestration unit 100 is a window and, specifically, a double-hung window. However, it will be appreciated that various features described herein can also be incorporated within other types of windows as well as doors, such as patio doors. For example, features herein can also be applied to designs for single-hung, casement, awning, sliding, and picture windows amongst others.

The impact-resistant fenestration unit 100 shown in FIG. 1 includes a top sash 120. The top sash 120 includes a first stile 122, a second stile 124, a top rail 126, and a check rail 128. The top sash 120 forms a first lower corner 170, a first upper corner 172, a second lower corner 174, and a second upper corner 176.

In various embodiments the first stile 122, second stile 124, top rail 126, and check rail 128 can be lineal extrusions formed of materials described in greater detail below. In the context of a double-hung window, the top sash 120 can slide up and down within the frame assembly 102. The top sash 120 includes a glass subassembly 130 therein. Details of exemplary glass subassemblies are provided in greater detail below.

The impact-resistant fenestration unit 100 also includes a bottom sash 140. The bottom sash 140 includes a first stile 142 and a second stile (not shown in this view). The bottom sash 140 also includes a bottom rail 148 and a check rail (not shown in this view). In various embodiments, the bottom rail 148 of the bottom sash 140 can be taller than the other rails, such as those of the top sash 120, and is sometimes referred to as a "tall bottom rail". The bottom sash 140 also includes a glass subassembly 150. Details of exemplary glass subassemblies are provided in greater detail below.

Figure 2:
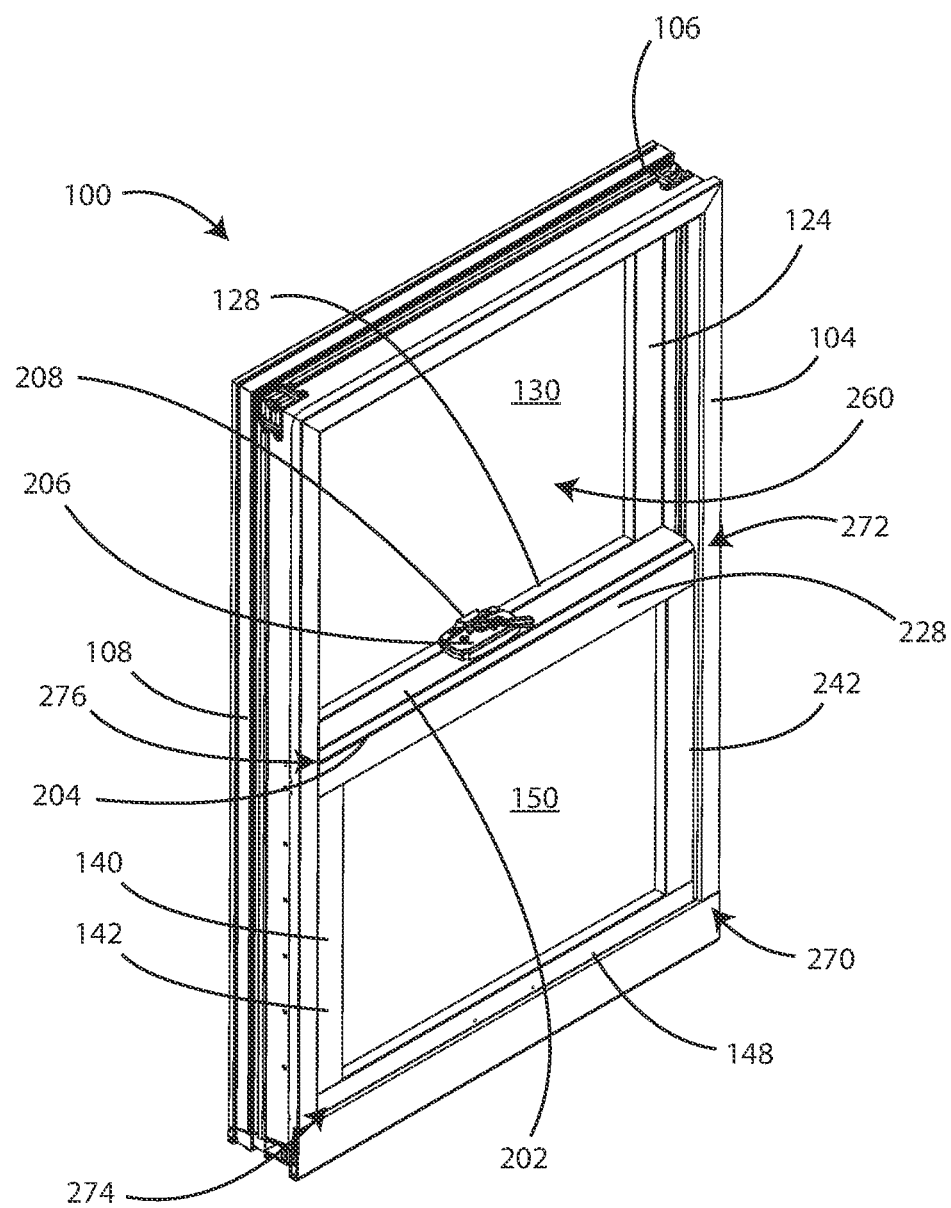
FIG. 2 is a perspective view of the interior side of an impact-resistant fenestration unit in accordance with various embodiments herein.

Referring now to FIG. 2, a perspective view of the interior side 260 of an impact-resistant fenestration unit 100 is shown in accordance with various embodiments herein. As before, the frame assembly 102 includes a first side jamb 104, a head jamb 106, a second side jamb 108, and a sill (not shown in this view). The top sash 120 includes a first stile (not shown in this view), a second stile 124, a top rail (not shown in this view), and a check rail 128.

As before, the impact-resistant fenestration unit 100 includes a bottom sash 140. The bottom sash 140 includes a bottom rail 148, a check rail 228, a first stile 142, and a second stile 242. The bottom sash includes first lower corner 270, first upper corner 272, second lower corner 274, and second upper corner 276. The bottom sash 140 is configured to move within the frame between a closed position where a bottom portion of the bottom sash engages the top of the sill 110 and an open position where the bottom portion of the bottom sash is separated from the top of the sill 110. Pins or other projections (not shown) can extend from the sides of the bottom sash 140 and fit within a channel (not shown) running vertically along an adjacent side of the side jambs to allow the bottom sash 140 to slide vertically, but still secure the bottom sash 140 within the frame assembly 102.

The impact-resistant fenestration unit 100 can also include various pieces of hardware. For example, the bottom sash 140 can includes a lock unit 206 (or sash lock) thereon, such as mounted on the bottom sash check rail 228. The top sash can include a lock keeper 208, such a mounted on the top sash check rail 128. The bottom sash check rail 228 can include a top surface including a flat portion 202 disposed between an interior window side top corner 204 and an exterior window side top corner (not shown in this view). The lock unit 206 can be mounted on the flat portion 202. In various embodiments, the flat portion 202 can have a width of less than 1.5, 1.25, 1.0 0.75, or 0.5 inches.

In various embodiments, the first stile 142 of the two opposed stiles and the bottom rail 148 intersect with the appearance of a mortise and tenon joint, such that the bottom rail 148 extends the full width of the bottom sash 140, but the opposed stiles do not extend the full height of the bottom sash 140. As such, the example of FIG. 2 stands in contrast to a design where the intersection of the stiles and rails is a mitered joint. The distinction here is significant not only for the difference in enhanced aesthetics provided for by the mortise and tenon joint but also because it impacts the length of lineal extrusions used to form the bottom sash and also reinforcement of the same. For example, in FIG. 2, since the rails extend all the way to the side edges of the bottom sash 140, they can more directly transfer loads to the frame assembly 102. There is a need to provide reinforcement and a means for effective load transfer between the ends of the check rail and the frame. Embodiments herein provide for such reinforcement in part by placing check rail brackets on the side jambs and/or by using two-piece check rail bolts and thereby reinforcing an interface between a check rail tilt bolt assembly and the side jamb of a frame of the fenestration.

Figure 3:
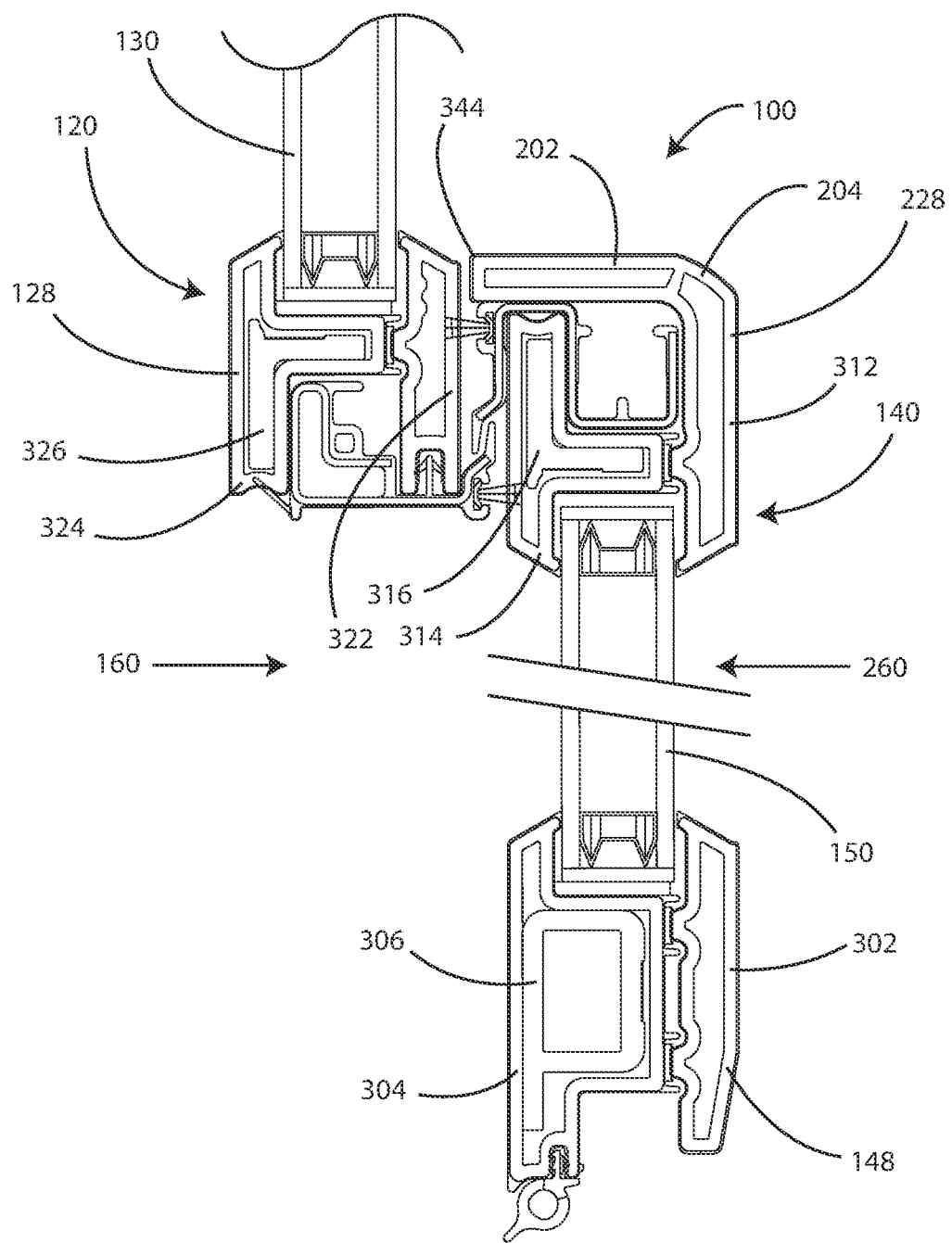
FIG. 3 is a cross-sectional view of a portion of an impact-resistant fenestration unit in accordance with various embodiments herein.

Referring now to FIG. 3, a cross-sectional view of a portion of an impact-resistant fenestration unit 100 is shown in accordance with various embodiments herein. FIG. 3 shows the interior side 260 of the impact-resistant fenestration unit 100 and the exterior side 160 thereof. The impact-resistant fenestration unit 100 includes a top sash 120 with components including a check rail 128 and a glass subassembly 130.

The check rail 128 can take on various forms and shapes. In various embodiments, the check rail 128 is formed using a lineal extrusion. In some cases, this can be a single piece lineal extrusion. However, in some cases, the check rail 128 can include two distinct lineal extrusions, three distinct lineal extrusions, or more. In the example of FIG. 3, the check rail 128 includes an interior lineal extrusion 322 and an exterior lineal extrusion 324. While not intending to be bound by theory, while thermal breaks are possible with a single extrusion, the use of at least two distinct lineal extrusions can be advantageous for thermal performance as it can readily create and/or facilitate the creation of a thermal break. While described with respect to the check rail 128, it will be appreciated that the same type of multi-part construction configuration can also be used with other components herein of the top sash, bottom sash, frame assembly, and the like.

In some embodiments, the interior lineal extrusion 322 and an exterior lineal extrusion 324 are formed of the same material, such as selected from those described in greater detail below. In other embodiments, the interior lineal extrusion 322 and an exterior lineal extrusion 324 are formed of different materials, such as each independently selected from those described in greater detail below. In some embodiments, the exterior lineal extrusion 324 is formed from a composition exhibiting greater resistance to damage (such as cracking or breaking) resulting from impacts of air borne projectiles.

The check rail 128 can also include a reinforcement member 326 therein. In some embodiments, the reinforcement member 326 can be held in place by the shape of the passage inside the lineal extrusion in which it sits. The reinforcement member 326 can be formed of various materials as described elsewhere herein.

The impact-resistant fenestration unit 100 also includes a bottom sash 140 with components including a bottom rail 148, a glass subassembly 150, and a check rail 228. As with the check rail 128 of the top sash 120, the bottom rail 148 of the bottom sash 140 in this example includes an interior side lineal extrusion 302 and an exterior side lineal extrusion 304. However, the bottom rail 148 could also be formed of a single lineal extrusion or with more than two lineal extrusions. The bottom rail 148 also includes a reinforcement member 306. In some embodiments, the reinforcement member 306 can be held in place by the shape of the passage inside the lineal extrusion in which it sits. In some embodiments, the reinforcement member 306 of the bottom rail 148 can have a different shape or configuration in cross-section. In various embodiments, the bottom rail 148 of the bottom sash 140 is taller allowing for different shapes and sizes of the reinforcement member 306 in cross-section.

In this example, the check rail 228 of the bottom sash 140 includes an interior side lineal extrusion 312 and an exterior side lineal extrusion 314. The check rail 228 of the bottom sash 140 also includes a check rail reinforcement member 316. In some embodiments, the reinforcement member 316 can be held in place by the shape of the passage inside the lineal extrusion in which it sits.

In will be appreciated that other components of the top sash and the bottom sash (such as the stiles, other rails, etc.) can also be constructed using a single-part, two-part (e.g., an interior side and exterior side lineal extrusions), or multi-part lineal extrusion designs.

In some embodiments herein where components include both interior side and exterior side lineal extrusions, reinforcement structures herein can be placed within both the interior and the exterior side lineal extrusions (e.g., multiple reinforcement structures can be used). However, in various embodiments herein where components include both interior side and exterior side lineal extrusions, reinforcement structures herein can specifically be placed within the exterior side lineal extrusions such as depicted with respect to FIG. 3. Thus, in some embodiments, reinforcement structures herein can be disposed within exterior side lineal extrusions, but not within interior side lineal extrusions.

While not intending to be bound by theory, placing reinforcement structures preferentially within exterior side lineal extrusions can offer multiple benefits. As a first example, airborne projectiles will generally originate from the exterior side of the window. Thus, providing reinforcement structures in an exterior side lineal extrusion places the reinforcement structure closer to a likely point of origination for loads associated with an impact. As a second example, providing reinforcement structures in an exterior side lineal extrusion frees up design opportunities for the interior side lineal extrusion. That is, the interior side lineal extrusion can be designed without a need to accommodate a reinforcement structure allowing for additional shapes and profiles. As such, in various embodiments herein, impact-resistant fenestration units can be configured to maintain impact-resistant properties independent of a profile shape of extrusions forming components of the top sash and/or the bottom sash, and/or components of the frame.

Interior side and exterior side lineal extrusions can be joined together in various ways. In some embodiments, such structures can be attached using mechanical fasteners. In some embodiments, such structures can be adhesively bonded together. In some embodiments, such structures can be attached using snap-fit or friction fit mechanisms. In some specific embodiments, an exterior side lineal extrusion and an interior side lineal extrusion can be attached to one another with at least one of foam tape and an adhesive.

While not intending to be bound by theory, formation of components of the top sash and the bottom sash with interior side and exterior side lineal extrusions can facilitate the formation of a thermal break therein to enhance energy efficiency. For example, formation of components with interior side and exterior side lineal extrusions can facilitate the formation of air pockets and/or a reduction in or lack of continuous material paths from the interior side of the fenestration to the exterior side of the fenestration. It will be appreciated, however, that thermal breaks can be formed in many different ways. In some embodiments, a continuous structural element passing from the exterior side to the interior side can be physically interrupted with another material in cross-section that is more resistant to conducting thermal energy (e.g., a better thermal insulator). For example, in various embodiments, a component of the frame, the bottom sash, and the top sash can include a portion interrupted with an insulating material in cross-section to create a thermal break.

Metals are generally very strong, and thus good for structural reinforcement but metals are typically also very good thermal conductors. Thus, while the use of metals can be beneficial for achieving coastal levels of structural impact requirements, their use is generally bad for thermal efficiency. As such, to improve thermal performance, in various embodiments, components of the frame, the bottom sash, and the top sash can lack a metal material interconnecting an exterior window side with an interior window side to prevent a path for substantial thermal conduction between the exterior side of fenestration and the interior side of the fenestration. In various embodiments, components of the frame, the bottom sash, and the top sash can lack a continuous metal path extending through the component (rail, stile, etc.) from a position on the interior side that is even with an interior facing surface of the glass subassembly to a position on the exterior side that is even with an exterior facing surface of the glass subassembly to prevent a path for substantial thermal conduction between the exterior side of fenestration and the interior side of the fenestration.

All things being equal, a structure that has less metal in it will be more thermally efficient than an otherwise similar structure including more metal since metals are such good thermal conductors. In various embodiments herein, metal makes up less than fixed percent by weight of the total weight of the impact-resistant fenestration unit 100, excluding the weight of metal provided by hardware and fasteners of the impact-resistant fenestration unit 100. For example, in some embodiments, the weight of metal can be less than or equal to 70 wt. %, 65 wt. %, 60 wt. %, 55 wt. %, 50 wt. %, 45 wt. %, 40 wt. %, 35 wt. %, 30 wt. %, 25 wt. %, 20 wt. %, 15 wt. %, 10 wt. %, or 5 wt. %, or can be an amount falling within a range between any of the foregoing.

In some configurations, the check rail 228 can include a top surface with a flat portion 202 disposed between an interior window side top corner 204 and an exterior window side top corner 344. The interior window side top corner 204 can include a larger (wider, less sharp) curve than the opposed exterior window side top corner 344. The larger, less sharp curve can be useful as it can prevent focusing forces associated with an impact coming from the exterior side of the window, thereby making structural failure of the check rail 228 less likely. In addition, coastal code impact testing procedures can regard opening of the lock (or sash lock) as a failure. While not intending to be bound by theory, it is believed that the larger, less sharp curve on the interior window side top corner 204 can result in less deflection of the check rail 228 making lock opening failures less likely. The larger, less sharp curve on the interior window side top corner 204 can also be useful to provide a more modern aesthetic to the look of the fenestration unit. In some embodiments, a radius of curvature of the interior corner can be greater than or equal to 0.1 inches, 0.2 inches, 0.3 inches, 0.4 inches, 0.5 inches, 0.6 inches, 0.7 inches, 0.8 inches, 0.9 inches, 1.0 inches, 1.1 inches, 1.2 inches, 1.3 inches, 1.4 inches, or 1.5 inches, or can be an amount falling within a range between any of the foregoing. The flat portion 202 of the check rail 228 can have a width can be less than or equal to 2.0 inches, 1.75 inches, 1.5 inches, 1.25 inches, 1.0 inches, 0.75 inches, or 0.50 inches, or can be an amount falling within a range between any of the foregoing.

Generally, fenestration units for coastal environments include at least one laminate pane that is designed to retain structural integrity even after substantial impacts from debris. In many cases, the laminate pane can be an interior laminate pane with an exterior pane being a non-laminate. However, in some cases, interior and exterior panes can both be laminate. In some cases, the exterior pane can be a laminate while the interior pane is not.

Laminate panes typically include a first glass layer, a second glass layer, and a polymeric material disposed between the first glass layer and the second glass layer. Embodiments herein can also include specialized components referred to as retention members that help to retain the laminate pane within the frame of the fenestration unit.

Figure 4:
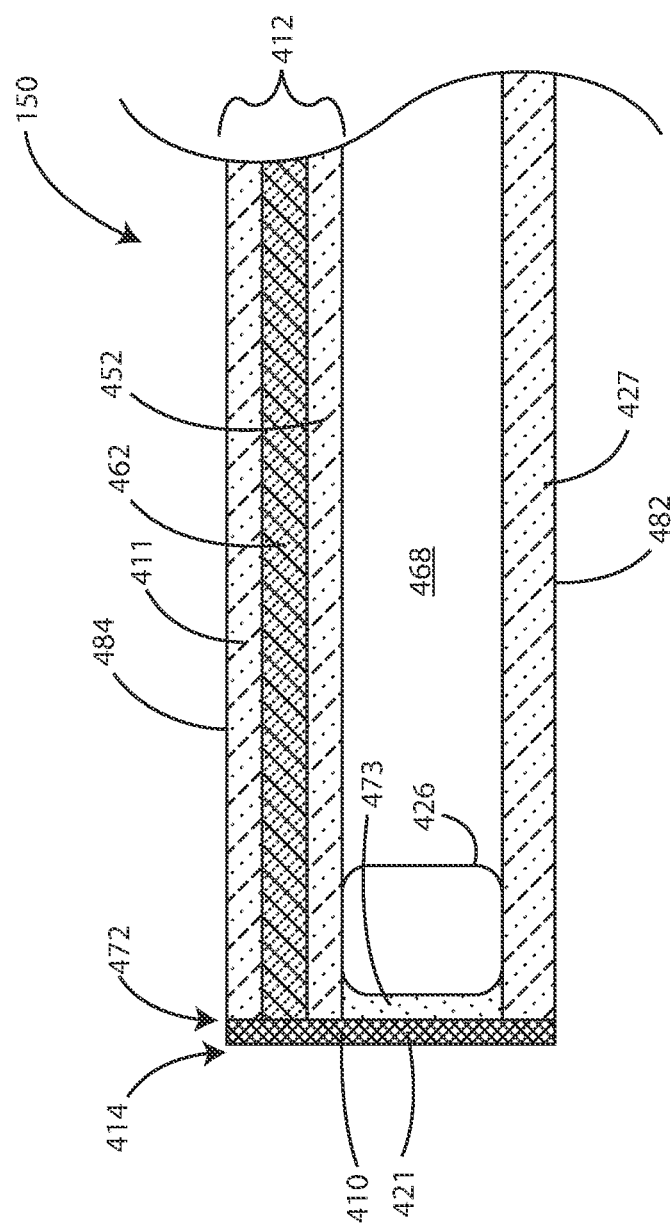
FIG. 4 is a schematic cross-sectional view of a glass subassembly in accordance with various embodiments herein.

Referring now to FIG. 4, a cross-sectional view is shown of a portion of a glass subassembly 150 in accordance with various embodiments herein. The glass subassemblies of the top sash and the bottom sash can be substantially the same. The glass subassembly 150 can include an interior laminate pane 412. The glass subassembly 150 can also include an exterior pane 427.

The glass subassembly 150 can include a proximal end 472. The glass subassembly 150 can also include an interior facing surface 484 and an exterior facing surface 482. The glass subassembly 150 also includes a sealing spacer 426. The sealing spacer 426 can serve to maintain a spacing distance between the interior laminate pane 412 and the exterior pane 427. The sealing spacer 426 can also serve to attach the interior laminate pane 412 to the exterior pane 427. The glass subassembly 150 also includes a space 468 between the interior laminate pane 412 and the exterior pane 427. The glass subassembly 150 also includes a secondary sealant 473. In various embodiments, the secondary sealant 473 can be disposed between the interior laminate pane 412 and the exterior pane 427, but on the opposite side of the sealing spacer 426 from the space 468.

The interior laminate pane 412 typically includes a first glass layer 411, a second glass layer 452, and a polymeric material 462 disposed between the first glass layer 411 and the second glass layer 452.

In various embodiments, the polymeric material 462 of the interior laminate pane 412 can include various polymers. In various embodiments, the polymeric material 462 disposed between the first glass layer 411 and the second glass layer 452 can include at least one of an ionoplast, a cast-in-place polymer, a thermoplastic, and a thermoset. In some embodiments, the polymeric material 462 can be elastomeric. In some embodiments, the polymeric material 462 can be non-elastomeric. In various embodiments, the polymeric material 462 disposed between the first glass layer 411 and the second glass layer 452 can include at least one of polyvinyl butyral (PVB), SGP (SENTRYGLAS PLUS), polyethylene terephthalate (PET), polyurethane (PUR), and ethylene-co-vinyl acetate (EVA), and hydrids/alloys/laminates/copolymers/composites thereof.

The polymeric material 462 disposed between the first glass layer 411 and the second glass layer 452 can have a thickness of various dimensions. In some embodiments, the thickness can be greater than or equal to 10, 20, 30, 45, 60, 75, or 90 mils. In some embodiments, the thickness can be less than or equal to 150, 135, 120, 105, or 90 mils. In some embodiments, the thickness can fall within a range of 30 to 150 mils, or 45 to 135 mils, or 60 to 120 mils, or 75 to 105 mils, or can be about 90 mils.

The glass layers can have thicknesses of various dimensions. In some embodiments, the thickness of the glass layers can be greater than or equal to 60, 75, 90, 120, or 150 mils. In some embodiments, the thickness can be less than or equal to 300, 200, or 150 mils. In some embodiments, the thickness can fall within a range of 60 to 300 mils, or 90 to 200 mils.

In various embodiments, the first glass layer 411 and the second glass layer 452 are the same thickness. In other embodiments, wherein the first glass layer 411 and the second glass layer 452 have different thicknesses.

In various embodiments, the polymeric material 462 may not be limited to being just between the glass layers of the interior laminate pane 412. By way of example, the polymeric material 462 can be disposed over at least a portion of a proximal end 472 of the interior laminate pane 412.

In various embodiments, the polymeric material 462 that is disposed over at least a portion of the proximal end 472 of the interior laminate pane 412 is the same as the polymeric material 462 disposed between the first glass layer 411 and the second glass layer 452. In various embodiments, the polymeric material 462 that is disposed over at least a portion of the proximal end 472 of the interior laminate pane 412 is integral with the polymeric material 462 disposed between the first glass layer 411 and the second glass layer 452. In various embodiments, the polymeric material 462 that is disposed over at least a portion of the proximal end 472 of the interior laminate pane 412 is joined to the polymeric material 462 disposed between the first glass layer 411 and the second glass layer 452 via thermal, mechanical, or chemical bonds, or other means. An interior facing surface 484 can be on the interior laminate pane 412. An exterior facing surface 482 can be on the exterior pane 427.

In various embodiments, window or door assemblies herein can include a retention member 410. In various embodiments, the retention member 410 can engage at least a portion of the interior laminate pane 412. In various embodiments, the retention member 410 having an elongation and tensile strength sufficient to provide the glass subassembly 150 with shock absorption and force dissipation protection that meets or exceeds one or more of ASTM E1886 (pressure cycling), ASTM E1996 (large and small missile impact), TAS 201 (impact), and/or TAS 203 (pressure cycling) standards.

The retention member 410 can include a base portion 421. In various embodiments, the base portion 421 can extend along and engage at least a portion of the proximal end 472 of the glass subassembly 150. In various embodiments, the base portion 421 can be of a length sufficient to project into and engage a heel bead within a channel of the upper sash or moveable lower sash to couple the retention member 410 to a frame member. In various embodiments, the base portion 421 can extend along and engage at least a portion of the proximal end 472 of the glass subassembly 150. In various embodiments, the base portion 421 can be of a width sufficient to project into and engage a bed glazing to couple the retention member 410 to a frame member.

In various embodiments, the retention member 410 includes a series of strips of a fibrous fabric or tape reinforcing material applied in succession about the interior facing surface 484 and a proximal end 472 portion of the glass subassembly 150 received within the channel 414 of the frame. In various embodiments, the retention member 410 includes a body having a series of openings formed therethrough to facilitate passage of an adhesive material through the retention member. It will be appreciated that retention members used herein can include a single layer of material or can include a plurality of layers of materials.

Figure 5:
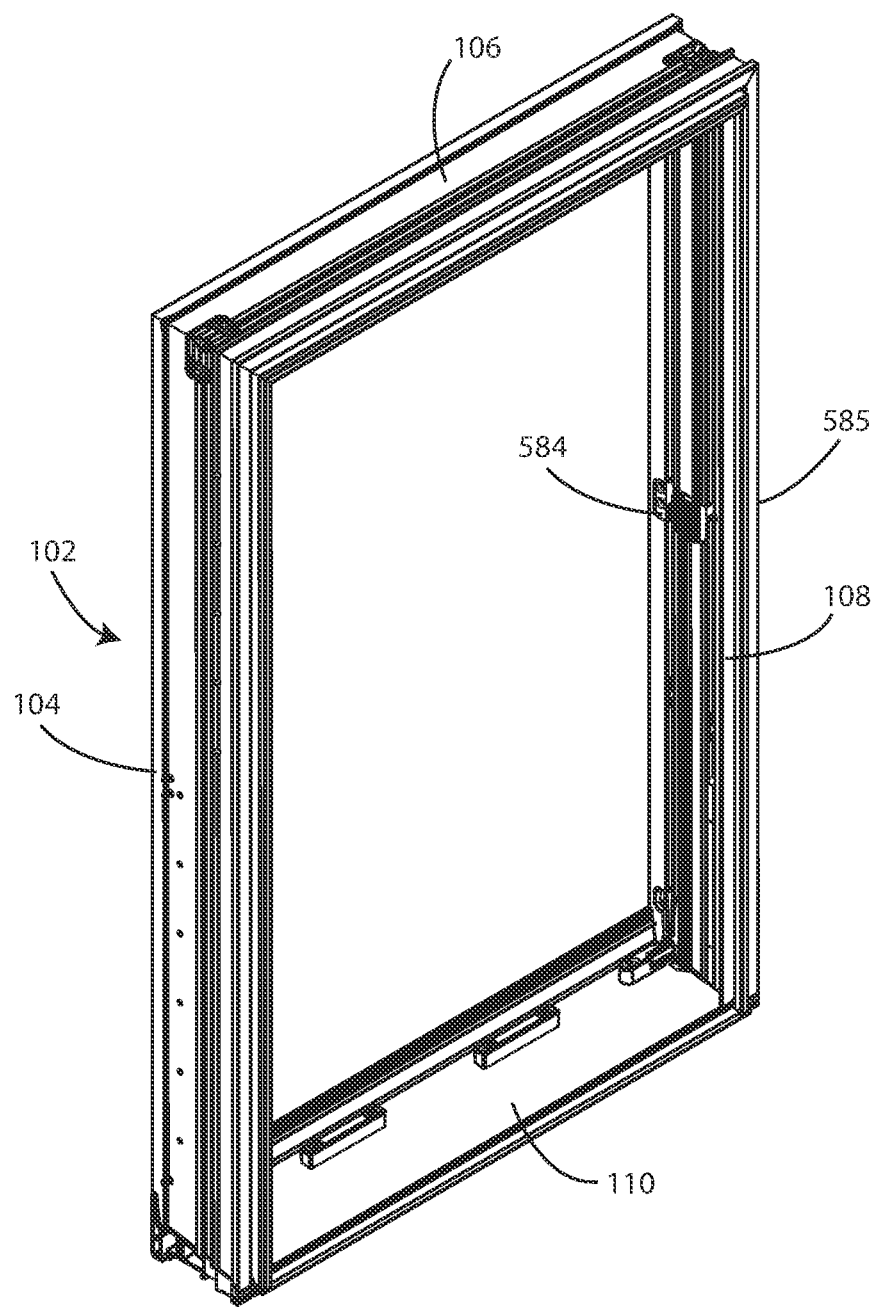
FIG. 5 is a perspective view of an outer frame assembly of an impact-resistant fenestration unit in accordance with various embodiments herein.

Referring now to FIG. 5, a perspective view of the outer frame assembly of an impact-resistant fenestration unit is shown in accordance with various embodiments herein. As before, the frame assembly 102 includes a first side jamb 104, a head jamb 106, a second side jamb 108, and a sill 110.

In various embodiments, the frame assembly 102 can include a first side bracket 584 mounted on one of the two opposed side jambs 104, 108. In various embodiments, the first side bracket is mounted at a height 585 corresponding to the position of the check rail 228 when the bottom sash 140 is in a closed position. Depending on the sash ratio of the fenestration, height 585 could be, for example, at any point from 20 and 80 percent, or from 30 to 70 percent, or from 40 to 60 percent of the overall height of the side jambs 104, 108.

In various embodiments, the frame assembly 102 can include a second side bracket (not shown in this view) mounted on the other of the two opposed side jambs 104, 108. In various embodiments, the second side bracket can also be mounted at a height 585 corresponding to the position of the check rail 228 when the bottom sash 140 is in a closed position. In various embodiments the first and second side brackets are mounted at substantially the same height on their respective side jambs 104, 108. In various embodiments, the first and second brackets are configured to interface with opposite ends of the check rail 228 and/or components disposed therein when the bottom sash 140 is in a closed position.

Figure 6:
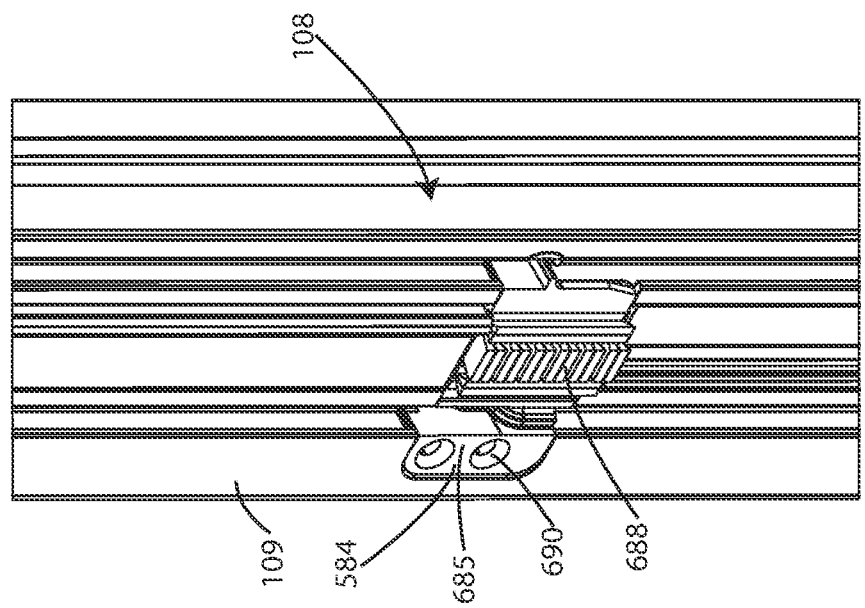
FIG. 6 is a perspective view of a side bracket mounted onto a side jamb in accordance with various embodiments herein in accordance with various embodiments herein.

Referring now to FIG. 6, a perspective view of a side bracket mounted onto a side jamb is shown in accordance with various embodiments herein. While the exemplary embodiment of FIGS. 6-8 depicts a side bracket mounted on the second side jamb 108, it should be appreciated that the description and disclosure of the first side bracket can also apply to a second side bracket mounted on the opposing side jamb 104.

In various embodiments, the side bracket 584 can define one or more apertures 690. In various embodiments, the side bracket 584 is at least partially embedded within a surface the side jamb 108. In various embodiments, the side bracket 584 is at least partially embedded within a surface the side jamb 108 sufficiently far to avoid interference with the side of the sash 140 as the sash 140 approaches the closed position as well as provide positive aesthetics by minimizing visibility of the side bracket 584. In various embodiments, a surface of the side bracket 584 is mounted flush with a surface of the side jamb 108. In some embodiments, a rear face of the side bracket 584 is mounted flush with an interior facing (facing the interior of the frame) surface of the side jamb 108. In some embodiments, an inside facing surface 685 (e.g., facing the interior of the frame) or front face of the side bracket 584 is mounted flush with a surface 109 the side jamb 108. In some embodiments, the inside facing surface 685 or front face of the side bracket 584 is recessed beneath the surface 109 the side jamb 108. In some embodiments, the side bracket 584 does not protrude from the surface 109 the side jamb 108. In some embodiments, the front face 685 the side bracket 584 does not protrude from the surface 109 the side jamb 108.

In various embodiments, the side bracket 584 can also include a fin pile 688 (such as a propylene or other polymer-based pile with a fin seal) and/or other weatherstripping materials to provide a seal against air, wind, and water infiltration when the sash is in a closed position. In some embodiments, the fin piles 688 of the side bracket 584 protrude outwards from a surface 109 the side jamb 108. In some embodiments, the fin piles 688 of the side bracket 584 protrude outwards from a surface 109 the side jamb 108 while the remainder of the side bracket 584 does not protrude from the surface 109 the side jamb 108.

Figure 7:
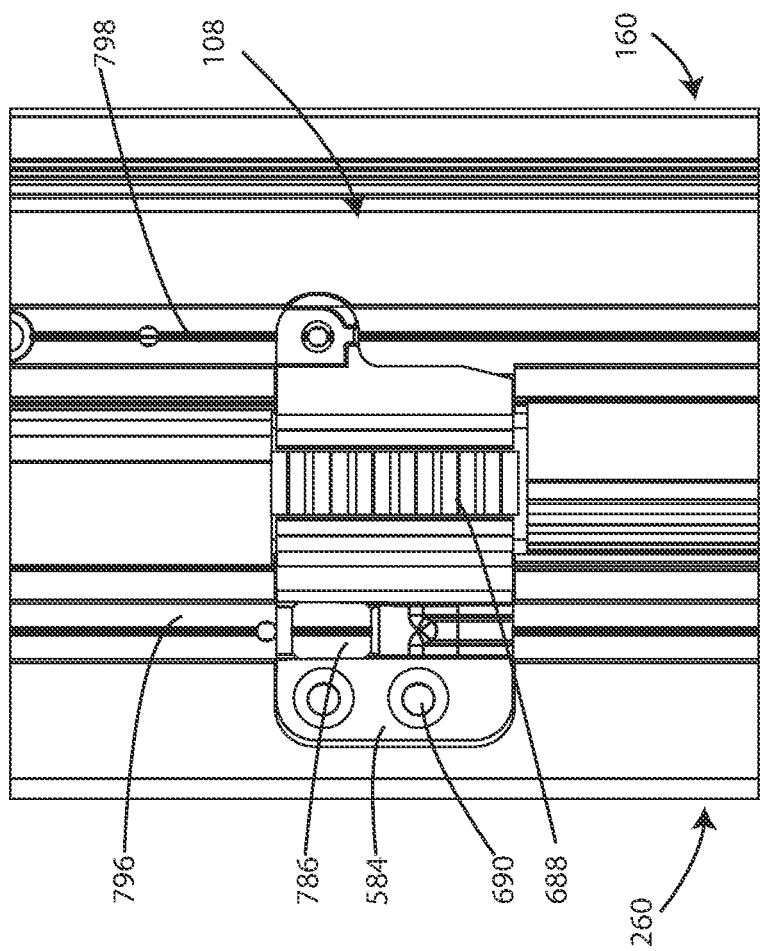
FIG. 7 is a front view of a side bracket mounted onto a side jamb in accordance with various embodiments herein in accordance with various embodiments herein.

Referring now to FIG. 7, a front view of a side bracket mounted in a side jamb is shown in accordance with various embodiments herein. The side jamb 108 can include a channel 796 extending along a vertical axis of the side jamb. In various embodiments, the channel can be disposed towards the interior side 260 of the impact-resistant fenestration unit 100. In various embodiments, a first end of the bottom rail 148 of the lower sash is configured to slide along the channel 796 of one of the two opposed side jambs 104, 108, and a second end of the bottom rail 148 is configured to slide along the channel of the opposing side jamb 104, 108 as the bottom sash moves between it open and closed positions.

The side jamb 104 can further include an exterior channel 798 extending along a vertical axis of the side jamb. In various embodiments, the exterior channel 798 is disposed towards the exterior side 160 of the impact-resistant fenestration unit 100. In some cases, an upper sash can slide up and down in the frame along the exterior channel 798.

In various embodiments, the interior channel 796 and the exterior channel 798 are substantially parallel to one and other. In various embodiments, the channel 796 and the exterior channel 798 are substantially rectangular in cross section, but other cross-sectional geometries are also contemplated herein.

As before, the side bracket 584 can include a fin pile 688, and one or more apertures 690, such as two shown in FIG. 7. The side bracket 584 can further define a cavity 786. In various embodiments, the side bracket 584 is mounted such that the cavity 786 of the side bracket is flush with the channel 796 of the side jamb 108. In various embodiments, the cavity 786 of the side bracket 584 can effectively form a portion of the channel 796 of the side jamb 108.

Referring now to FIG. 8 a perspective view of a side bracket mounted on a side jamb is shown in accordance with various embodiments herein. As before, the side bracket 584 can include a fin pile 688, and one or more apertures 690, and a cavity 786.

FIG. 8 also shows a bolt 892 mounted onto the side bracket 584. In some embodiments, the bolt 892 interfaces with the cavity 786 of the side bracket 584. In some embodiments, the cavity is configured to receive a portion of the bolt 892. It will be appreciated that the bolt 892 is typically disposed within an end of a check rail of the bottom sash of a fenestration unit, but it is shown here without the check rail for ease of illustration.

Referring now to FIG. 9 a perspective view of a pair of side brackets is shown in accordance with various embodiments herein. In various embodiments, each of the side brackets 584, 984 can include a cavity 786, a fin pile 688, and one or more apertures 690.

In various embodiments, the pair of side brackets can include a first side bracket 584 configured to be mounted on one of the two opposed side jambs 104, 108 and a second side bracket 984 configured to be mounted on the other of the two opposed side jambs 104, 108. In various embodiments, the first side backet 584 can have a right-handed orientation and the second side bracket 984 can have a left-handed orientation, such that when the first and second brackets are mounted on opposing side jambs 104, 108, their cavities 786 are substantially aligned vertically and can receive bolts protruding from opposing ends of the check rail 228.

In the embodiment shown in FIG. 9, the first side bracket 584 is configured to be mounted on the second side jamb 108 and the second side bracket 984 is configured to be mounted on the first side jamb 104. However, it will be appreciated that references to "first" and "second" used herein to distinguish between two different objects and can be interchanged as dictated by the context thereof. In this embodiment, the side brackets are configured mounted in the opposed side jambs 104, 108, such that the one or more apertures 690 of the first and second brackets are positioned towards the interior side 260 of the impact-resistant fenestration unit 100 and that the cavities 786 of the first and second side brackets are substantially aligned to receive bolts protruding from opposing ends of the check rail 228.

The side brackets described herein can be formed of various materials. By way of example, side brackets can be formed from polymers, metals, composites, ceramics, and the like. In some embodiments, the side brackets can be formed from a metal. In some embodiments, the side brackets can be formed from zinc containing metal, such as a zinc alloy. In some embodiments, the side brackets can be formed from Zamak 3.

The side brackets described herein can be subject to various treatments. By way of example, side brackets can be treated with various corrosion inhibiting coatings such as a chromate conversion coating, alodine coating, or the like. In various embodiments, a treatment can be applied as a powder coat painting.

Figure 10:
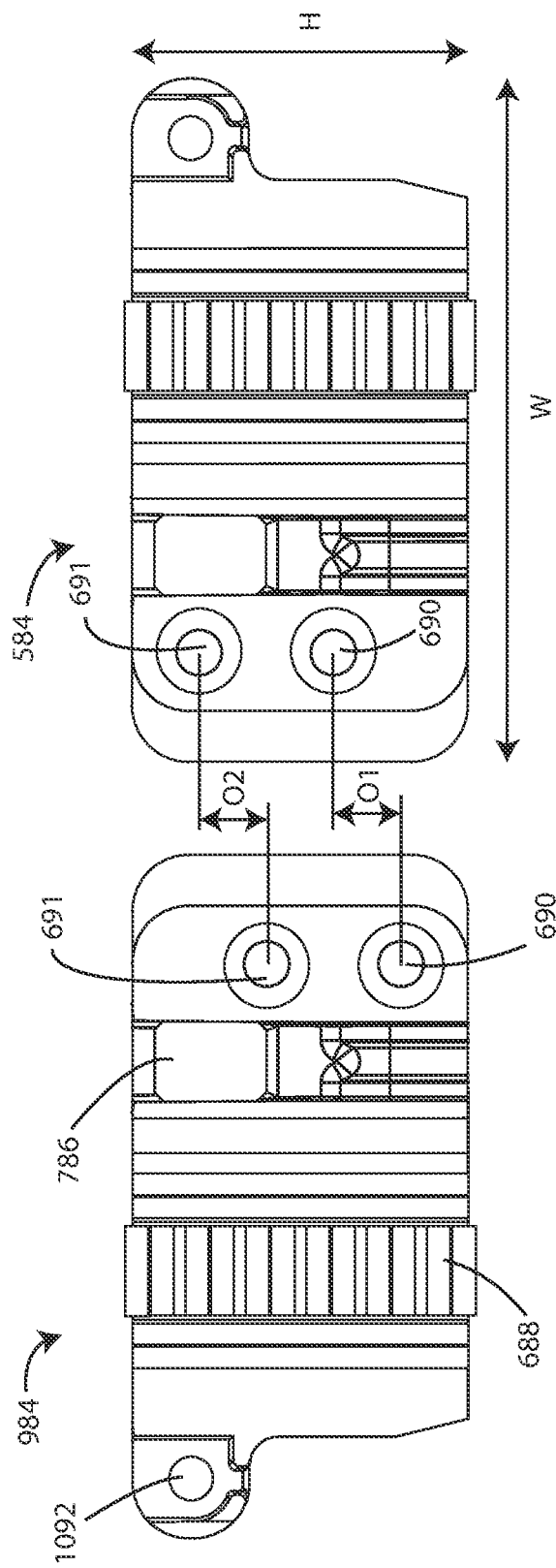
FIG. 10 is a front view of a pair of side brackets in accordance with various embodiments herein in accordance with various embodiments herein.

Referring now to FIG. 10, a front view of a pair of side brackets is shown in accordance with various embodiments herein. In various embodiments, each of the side brackets 584, 984 can include a cavity 786, a fin pile 688, one or more apertures 690, and balancing aperture 1092.

In various embodiments, first and second side brackets 584, 984 have a width W and a height H. The width of the first bracket can be substantially equal to the width of the second bracket and the height of the first bracket can be substantially equal to the height of the second bracket. The width W and the height H of the first and second side brackets 584, 984 can be selected to fit within an opening of a particular side jamb 104, 108.

In some embodiments, the width W of each bracket can be greater than or equal to 2, 3, 4, or 4 inches. In some embodiments, the width W of each bracket can be less than or equal to 8, 7, 6, 5, or 4 inches. In some embodiments, the width W of each bracket can fall within a range of 2 to 8 inches, or 2 to 7 inches, or 3 to 6 inches, or 4 to 5 inches, or can be about 4 inches.

In some embodiments, the height H of each bracket can be greater than or equal to 1, or 3 inches. In some embodiments, the height H of each bracket can be less than or equal to 6, 5, 4, or 3 inches. In some embodiments, the height H of each bracket can fall within a range of 1 to 6 inches, or 2 to 5 inches, or 2 to 4 inches, or can be about 3 inches.

In various the first and second side brackets 584, 984 each define a cavity 786 configured receive a portion of the bolt 892 such as to retain each bolt into its respective cavity and lock the bottom sash in place. As depicted in the FIG. 10, the cavities are substantially rectangular in cross section, but other cross sections are contemplated herein. In various embodiments, the cross section of the cavity is selected to be compatible with the cross section of the portion of the bolt 892 to be received by the cavity. In various embodiments, the cross section of the cavity 786 is selected to be of the same cross-sectional shape as the portion of the bolt 892 to be received by the cavity. In some embodiments, both the cavities 786 and bolts 982 are substantially rectangular in cross section. Such a configuration prevents rotation of the bolts 892 with respect to the cavities 786. In some embodiments, the cross section of the cavity is selected have substantially the same dimensions as cross section of the portion of the bolt 892 to be received by the cavity. In some embodiments, the cross section of the cavity is selected to be slightly larger than the cross section of the portion of the bolt 892 to be received by the cavity, such that there is a tolerance between the bolt and the cavity.

In some embodiments the depth of the cavity 786 extends all the way through the bracket 584, forming an opening or through the aperture in the bracket. In some embodiments the depth of the cavity 786 extends all the way through the bracket. In some embodiments, the depth of the cavity can be greater than or equal to 50%, 60%, 70%, 80%, 90%, or 100% of the depth of the bracket 584 or can be an amount falling within a range between any of the foregoing.

In various embodiments, the first and second brackets each have at least one aperture 690 configured to receive a fastener. The apertures 690 can be substantially circular in cross section. In various embodiments, the apertures can be tapered to receive a fastener such as a screw, or the like.

In various embodiments, the aperture of the first bracket is at a vertical offset "O1" from the aperture of the second bracket. In some embodiments, vertical offset is greater than the diameter of the fasteners to be received by the apertures 690. In some embodiments, vertical offset is greater than about 0.1, 0.2, 0.3, 0.4, 0.5, 0.75, 1, or 1.5 inches, or a distance falling within a range between any of the foregoing. In some embodiments, the first and second brackets each have a first aperture 690 and a second aperture 691, each aperture configured to receive a fastener. In some embodiments, the first aperture 690 of the first bracket 584 is at a vertical offset O1 from the first aperture 690 of the second bracket 984 and second aperture 691 of the first bracket is at a vertical offset O2 from the second aperture of the second bracket. Vertical offset O2 can be the same or different than vertical offset O1. In various embodiments, each of the apertures 690, 691 of the first bracket are vertically offset from each of the apertures of the second bracket. Such a configuration allows for multiple impact-resistant fenestration units 100 to be mulled together without interference between the fasteners corresponding to each aperture 690, 691.

In various embodiments, the first and second brackets each have at least one balancing aperture 1092 configured to receive a fastener. The balancing aperture 1092 can be substantially circular in cross section. In various embodiments, the balancing aperture 1092 can be tapered to receive a fastener such as a screw, or the like. In some embodiments, passing a fastener through the balancing aperture 1092 can secure the bracket to the side jamb. In some embodiments, the fastener passing through the balancing aperture can be such that it does not pass fully through the frame of the fenestration unit (e.g., it does not pass into a surrounding rough opening in the wall of a building).

Referring now to FIGS. 11-18, a method of mounting a side bracket into a side jamb is shown and described in accordance with various embodiments herein.

Figure 11:
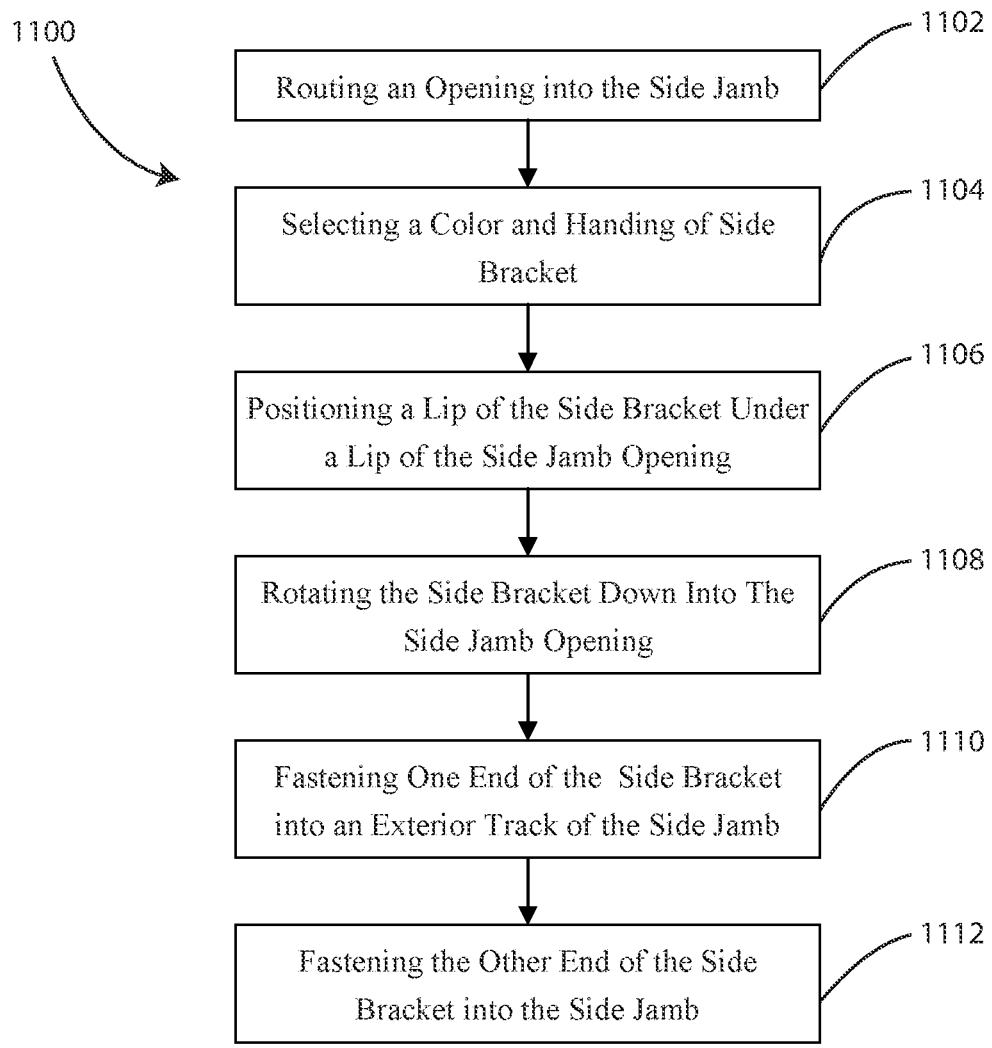
FIG. 11 is a method of mounting a side bracket into a side jamb in accordance with various embodiments herein in accordance with various embodiments herein.

Referring now to FIG. 11, the method 1100 can include the step 1102 of routing an opening into the side jam. In various embodiments, the opening can routed by any number of known machining techniques. In various embodiments, this step can be conducted in in a factory or manufacturing plant.

Figure 12:
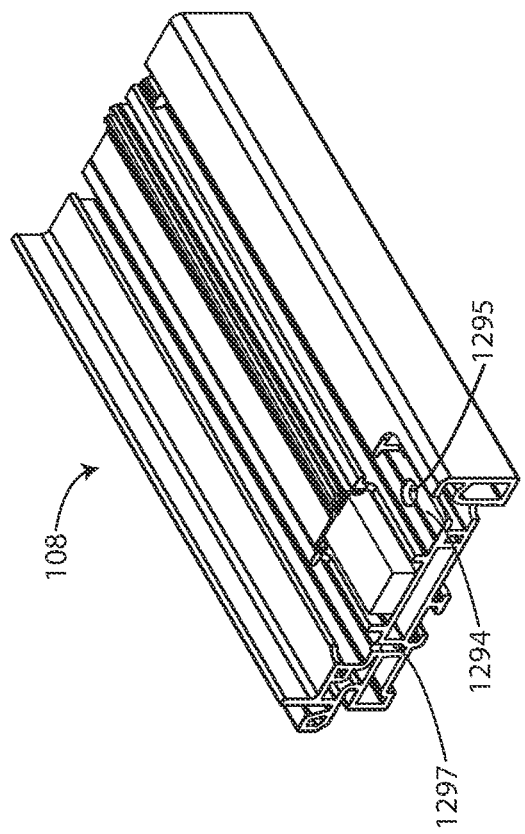
FIG. 12 is perspective view of a side jamb in accordance with various embodiments herein in accordance with various embodiments herein.

Referring now to FIG. 12 a perspective view of a side jamb shown in accordance with various embodiments herein. In various embodiments, the side jamb 108 can include an opening 1294, one or more opening apertures 1295, and one or more exterior channel apertures 1297. In various embodiments, the width and height of the opening 1294 are machined to be substantially equal to the width W and height H of the side bracket 584 to be received by the opening.

The side jamb opening 1294 can include one or more opening apertures 1295. In various embodiments, the opening apertures 1295 can be "through apertures" such that the depth of the opening apertures extend through the side jamb 108. Alternatively, the depth of the opening apertures can extend partially through the side jamb 108. In various embodiments, the opening apertures are threaded to and/or sized to engage with fasteners, such as screws or the like.

The side jamb opening 1294 can include one or more exterior channel apertures 1297. In various embodiments, the channel apertures 1297 can be through apertures such that the depth of the exterior channel apertures 1297 extend all the way through the side jamb 108. Alternatively, as depicted by FIG. 12 the depth of the exterior channel apertures 1297 can extend partially through the side jamb 108. In various embodiments the exterior channel apertures 1297 are threaded to and sized to engage with fasteners, such as screws or the like.

The method 1100 can include the step 1104 of selecting an appropriate color and handing of a side bracket. In various embodiments, the color of the side bracket 584 is selected to match or coordinate with the color of the side jamb 104 or any other component of the impact-resistant fenestration unit 100. In various embodiments a right-handed side bracket is selected for one of the two opposed side jambs 104, 108 and a left-handed side bracket is selected for the other of the two opposed side jambs 104, 108. After selecting the appropriate side bracket, the bracket can be mounted onto the side jamb.

Figure 13:
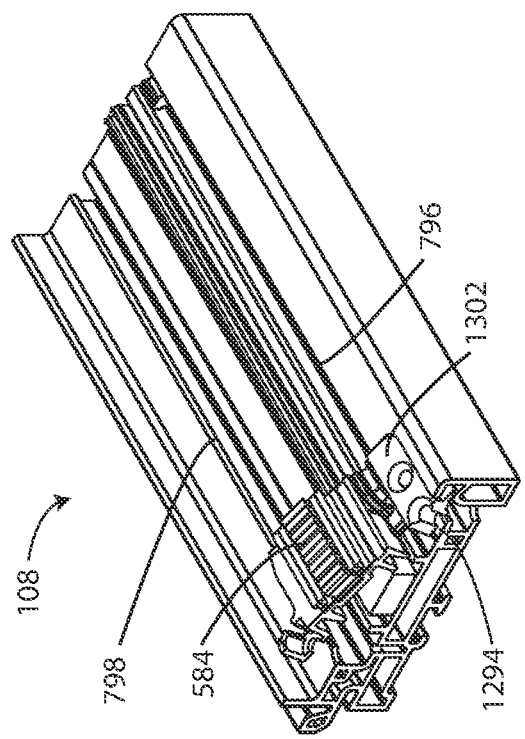
FIG. 13 is a perspective view of a side jamb in accordance with various embodiments herein in accordance with various embodiments herein.

Referring now to FIG. 13 a perspective view of a side jamb shown in accordance with various embodiments herein. In various embodiments, the side jamb 108 can include an opening 1294, one or more opening apertures 1295, a channel 796, and an exterior channel 798. FIG. 13 depicts a side bracket 584 being brought into engagement with the side jamb 108. In various embodiments, bringing the bracket into engagement with the side jamb includes angling a lip 1302 of the side bracket 584 in the direction of the channel 796.

The method 1100 can include the step 1106 of positioning a lip of the side bracket under a lip of the opening of the side jam. This step provides a simple and robust way to ensure that the bracket 584 is at the correct alignment and orientation with respect to the side jamb 108. In various embodiments, this step can be executed in a factory or manufacturing plant.

Figure 14:
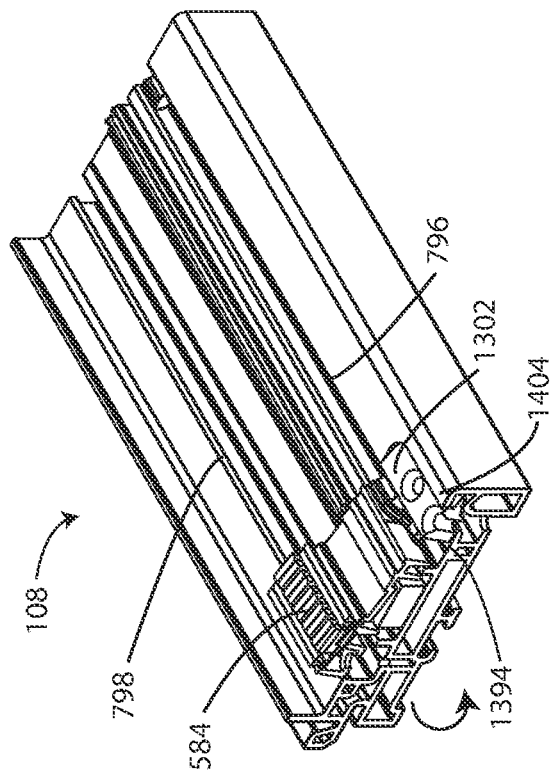
FIG. 14 is a perspective view of a side jamb in accordance with various embodiments herein in accordance with various embodiments herein.

Referring now to FIG. 14 a perspective view of a side jamb shown in accordance with various embodiments herein. In various embodiments, the side jamb 108 can include an opening 1394, an interior channel 796, and an exterior channel 798, and side jamb lip 1404. FIG. 14 depicts a side bracket 584 being brought into engagement with the side jamb 108. In various embodiments, bringing the bracket into engagement with the side jamb includes positioning a lip 1302 of the side bracket 584 under the side jamb lip 1404.

The method 1100 can include the step 1108 rotating the side bracket down into the opening of the side jamb. The direction of rotation can be denoted by the arrow in FIG. 14. In various embodiments, step 1108 is executed after the lip 1302 of the side bracket 584 is positioned under the side jamb lip 1404. In various embodiments, this step can be executed in a factory or manufacturing plant.

Figure 15:
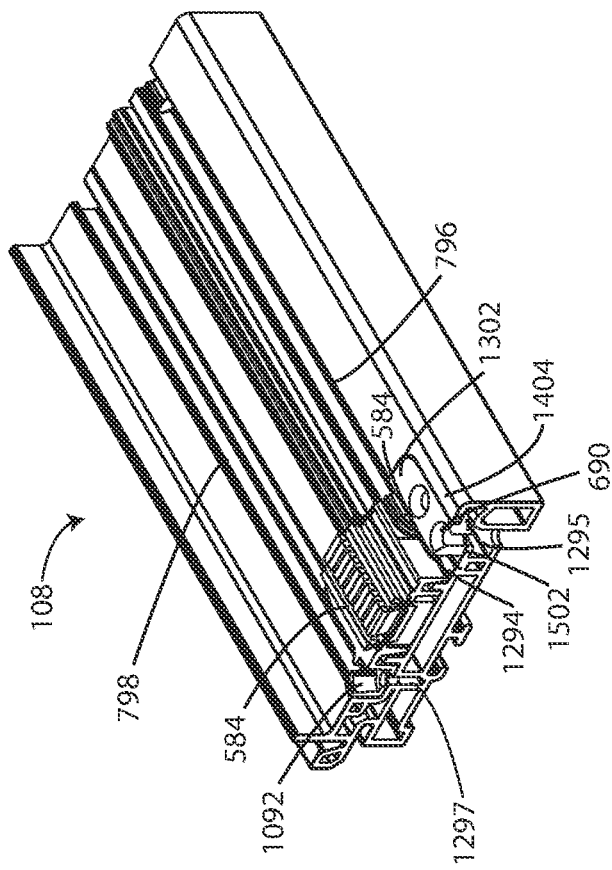
FIG. 15 is a perspective view of a side jamb in accordance with various embodiments herein in accordance with various embodiments herein.

Referring now to FIG. 15 a perspective view of a side jamb shown in accordance with various embodiments herein. the side jamb 108 can include an opening 1394, an interior channel 796, and an exterior channel 798, and side jamb lip 1404. FIG. 15 depicts a side bracket 584 fully seated on a side jamb after being rotated down into the side jamb. In various embodiments, a bottom surface of the fully seated side bracket 1502 sits flush against the side jamb opening 1294. In various embodiments, the fully seated side bracket is at least partially embedded side jamb opening 1294. In various embodiments, the cavity 786 of the fully seated side bracket 584 is flush with the channel 796 of the side jamb.

In various embodiments, the one or more side jamb opening apertures 1295 are axially aligned with the one or more apertures 690 of the fully seated side bracket 584. In various embodiments, exterior channel aperture 1297 is axially aligned with the balancing aperture 1092 of the fully seated side bracket 584.

The method 1100 can include the step 1110 of fastening down one end of the side bracket into an exterior channel of the side jamb. In various embodiments, the side bracket is fastened in the side jamb using a balancer screw. In various embodiments, this step is executed in a factory or manufacturing plant.

Figure 16:
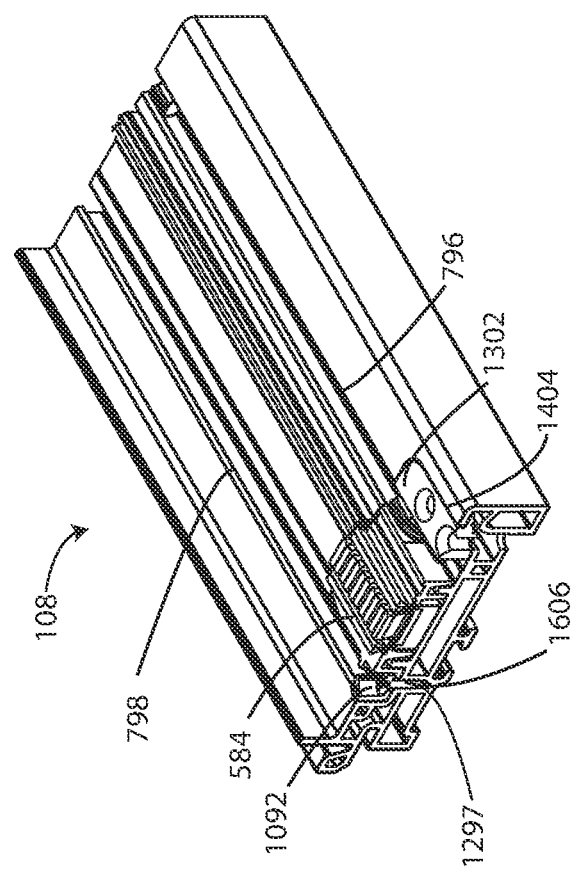
FIG. 16 is a perspective view of a side jamb in accordance with various embodiments herein in accordance with various embodiments herein.

Referring now to FIG. 16 a perspective view of a side is jamb shown in accordance with various embodiments herein. FIG. 16 depicts a side bracket 584 fully seated on a side jamb 108. In various embodiments, balancer screw 1606 is inserted into the balancing aperture 1092 of the bracket 584 and exterior channel aperture 1297. In some embodiments, the balancer screw is threaded into the exterior channel aperture 1297.

The method 1100 can include the step 1112 of fastening the other end of the side bracket in the opening apertures 1295 to the side jamb. In various embodiments, this step comprises selecting appropriate fasteners and inserting the fasteners into the one or more apertures 690 of the bracket 584. In various embodiments, the fasteners are selected to be compatible in cross section with the bracket apertures 690 and the side jamb opening apertures 1295. In various embodiments, the fasteners are selected to be long enough to extend through the side jamb 108 and into a rough opening, when the fasteners are fully inserted into the bracket 584 and side jamb. In some embodiments, these fasteners can be 2, 2.5, 3, 3.5, 4, 5 or more inches in length, or having a length falling within a range between any of the foregoing.

Figure 17:
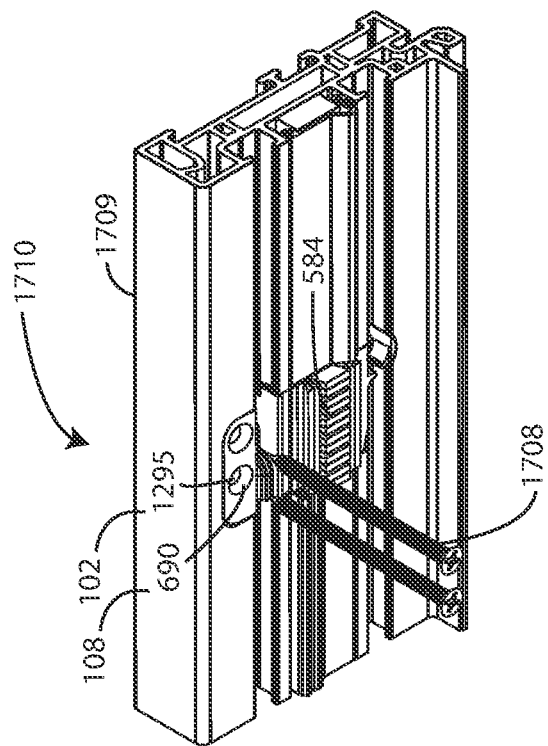
FIG. 17 is a perspective view of a side jamb in accordance with various embodiments herein in accordance with various embodiments herein.

Referring now to FIG. 17 a perspective view of a side jamb shown in accordance with various embodiments herein. FIG. 17 depicts a side bracket 584 fully seated on a side jamb 108. FIG. 17 depicts one or more fasteners 1708 being inserted into the one or more apertures 690 of bracket 584. In various embodiments, the fasteners 1708 are inserted through the one or more apertures 690 of the bracket 584 and into the side jamb opening apertures 1295. In various embodiments, the one or more fasteners 1708 are threaded into the one or more side jamb opening apertures 1295. In various embodiments, after being fully inserted, the fasteners extend past an exterior side 1709 of the side jamb.

Figure 18:
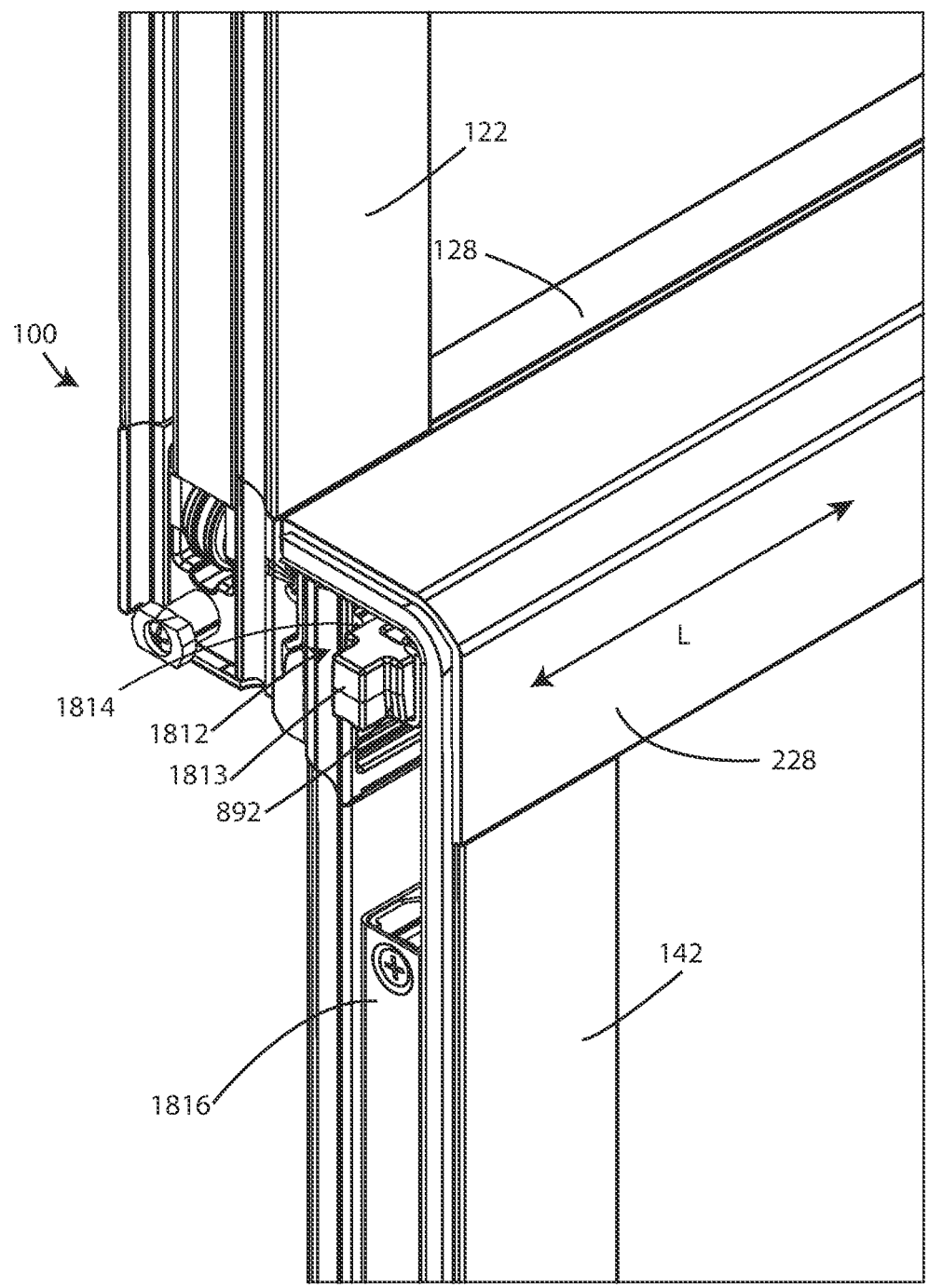
FIG. 18 is a perspective view of part of an impact-resistant fenestration unit in accordance with various embodiments herein.

In some embodiments, the first and second side brackets 584, 984 are anchored in place each using a fastener 1708 that penetrates through the frame assembly 102 into an area 1710 outside the frame assembly. In some embodiments, area 1710 can be the rough opening of a home, building, or other structure. In some embodiments, fastener 1708 is inserted through the side bracket and the frame assembly 102 of the impact-resistant fenestration unit 100 and into a rough opening surrounding the impact-resistant fenestration unit. While not intending to be bound by theory, inserting the fasteners into the rough opening increases the maximum impact force that can be withstood by the impact-resistant fenestration unit. The fasteners can promote the efficient transfer of a load from the bracket, through the frame, and into the rough opening. Performance qualities of the impact-resistant fenestration unit will be discussed in greater detail below. Referring now to FIG. 18, a perspective view is shown of part of an impact-resistant fenestration unit in accordance with various embodiments herein. The impact-resistant fenestration unit 100 includes a top sash having a first stile 122 and a check rail 128. The impact-resistant fenestration unit 100 also includes a bottom sash having a first stile 142 and a check rail 228. In the view of FIG. 18, the side jamb of the impact-resistant fenestration unit 100 is hidden to show a sash tilt bolt assembly 1812 and a balancer 1816 along the side of the bottom sash.

In various embodiments, the sash tilt bolt assembly 1812 can include a bolt 892 disposed within a housing 1814. In some embodiments, the housing 1814 is formed from a portion of the check rail 228. In other embodiments, the housing 1814 is formed from a separate structure embedded in the check rail 228. In various embodiments, the interior of the housing is formed to be compatible in shape and size to the length cross section of the bolt 892. In some embodiments, the interior of the housing 1814 and the bolt 892 are both substantially rectangular in cross section, but other geometries are also contemplated herein. In various embodiments, the bolt 892 is fitted into the housing such that the bolt can translate in a longitudinal direction L of the check rail 228 but remains substantially stationary in all other directions of motion. In various embodiments, at least a portion 1813 of the bolt 892 is configured to protrude from the housing 1814.

The housing 1814 described herein can be formed of various materials. By way of example, housing can be formed from polymers, metals, composites, ceramics, and the like. In some embodiments, the housing can be formed from a metal. In some embodiments, the housing can be formed from an aluminum containing metal.

The impact-resistant fenestration unit 100 includes a balancer 1816 embedded in the stile 142. Balancer 1816 can be any mechanism configured to counter the force of gravity to hold the bottom sash upright enabling the bottom sash to move within the frame between a closed position and an open position more smoothly and easily. However, in some embodiments, the balancer 1816 can be external to the stile 142.

Figure 19:
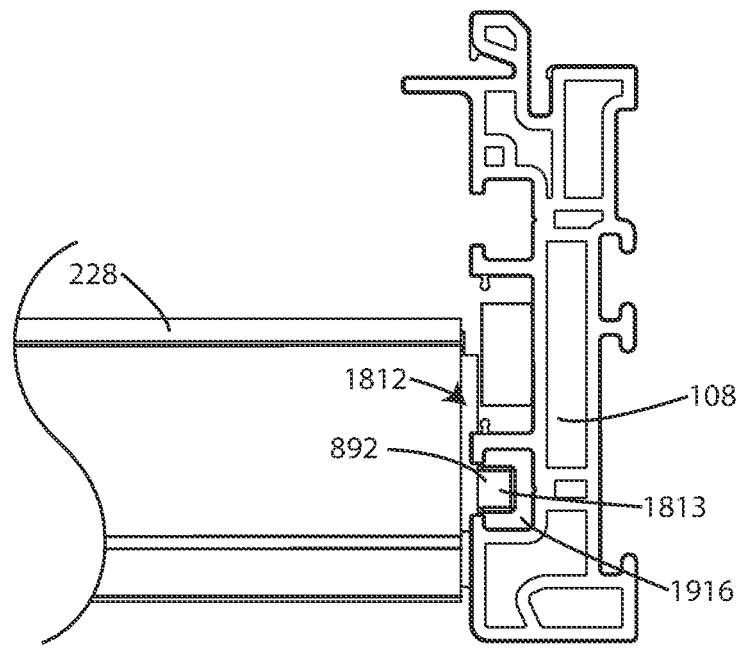
FIG. 19 is a schematic view of a bolt assembly interfacing with a side jamb in accordance with various embodiments herein.

Referring now to FIG. 19, a schematic view of a bolt assembly interfacing with a side jamb shown in accordance with various embodiments herein. The exemplary embodiment of FIGS. 19-20 depicts only the right most portion of check rail 228 interfacing with second side jamb 108, but it should be appreciated that the following description also applies to the left most portion of check rail 228 interfacing with first side jamb 104.

As depicted by FIG. 19, portion 1813 of bolt 892 extends outward from the housing 1814 of the sash tilt bolt assembly 1812 and is received by a cavity 1916 of side jamb 108.

Figure 20:
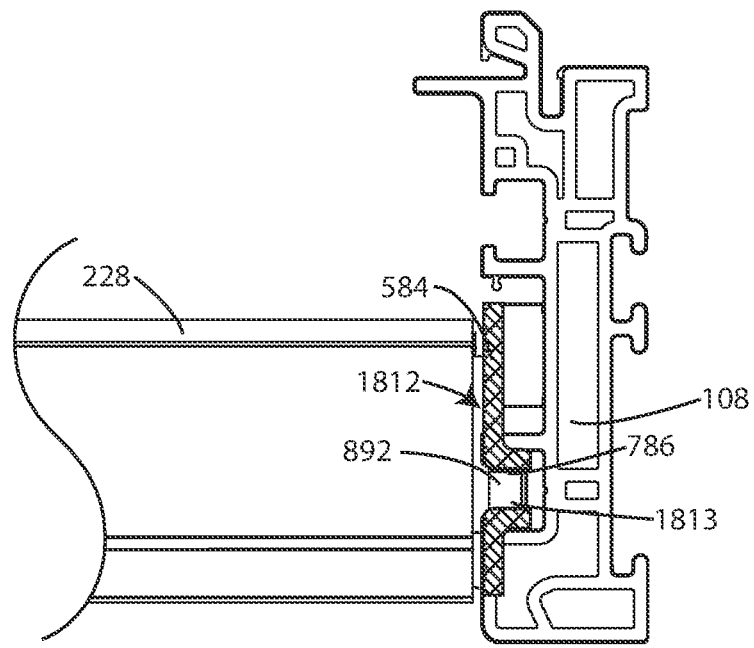
FIG. 20 is a schematic view of a bolt assembly interfacing with a bracket in accordance with various embodiments herein.

Referring now to FIG. 20, a schematic view of a bolt assembly interfacing with a side bracket shown in accordance with various embodiments herein. Similar to FIG. 19, a portion 1813 of bolt 892 extends outward from the housing 1814 of the sash tilt bolt assembly 1812. FIG. 20 further includes a side bracket 584 (illustrated schematically for clarity) mounted to the side jamb 108. Accordingly, the portion 1813 of bolt 892 is received by a cavity 786 of the side bracket 584.

In various embodiments, opposing side jambs 104, 108 are constructed from a polymer and the first and second brackets 584, 984 are constructed from a metal. While not intending to be bound by theory, reinforcing the side jambs with metal side brackets increases the maximum impact force that can be withstood by the impact-resistant fenestration unit. Performance qualities of the impact-resistant fenestration unit will be discussed in greater detail below.

Figure 21:
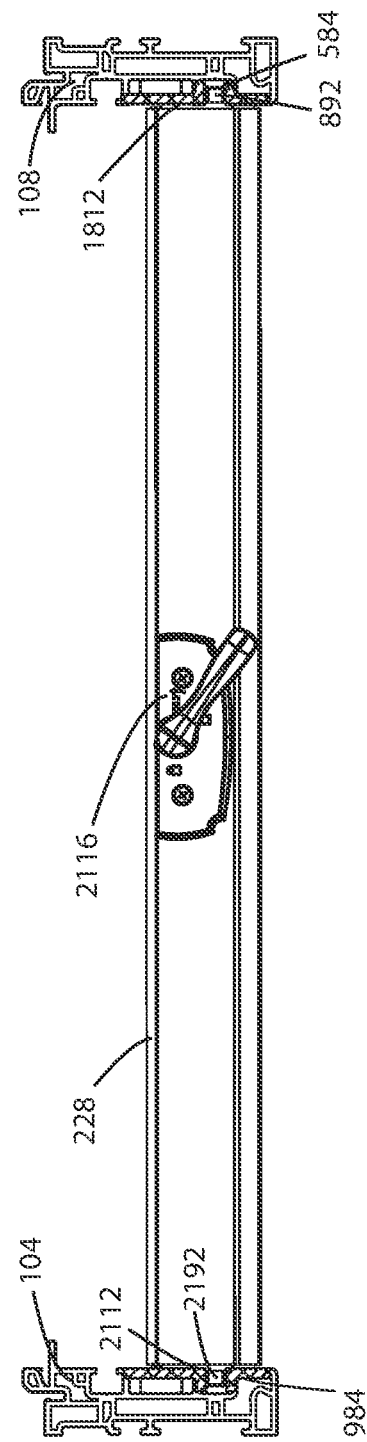
FIG. 21 is a schematic view of an impact-resistant fenestration unit in accordance with various embodiments herein.

Referring now to FIG. 21, a schematic view of an impact-resistant fenestration unit in accordance with various embodiments herein. The impact-resistant fenestration unit can include a check rail 228 interfacing with two opposing side jambs 104, 108. The impact-resistant fenestration unit can include a first sash tilt bolt assembly 1812 comprising a bolt 892 and a second sash tilt bolt assembly 2112 comprising a bolt 2192. The first and second sash tilt bolt assemblies 1812, 2112 can be disposed on opposite sides of the check rail 228.

The impact-resistant fenestration unit can include a first side bracket 584 mounted onto the second side jamb 108, the first side bracket defining a cavity to receive a portion of the bolt 892 of the first sash tilt bolt assembly 1812. The impact-resistant fenestration unit can include a second side bracket 984 mounted onto the first side jamb 104, the first side bracket defining a cavity to receive a portion of the bolt 2192 of the first sash tilt bolt assembly 2112.

In various embodiments, the first and second bolts 892, 2192 are configured to move between an open position and a locked position. In some embodiments, the first and second brackets are spring-loaded to be biased into the locked position. However, in various embodiments, the first and second bolts are not spring-loaded. In the open position the bolts 892, 2192 are retracted into their respective housings. In the locked position, a portion of the bolts 892, 2192 project from their respective housings. In some embodiments, the bolts are configured to move between the open position and the locked position by actuation of a window lock 2116. There can be a mechanical linkage between the window lock 2116 and the bolts 892, 2192 such that actuation of the window lock 2116 can move the bolts between their open and locked positions. In some embodiments, however, the bolts are configured to move between the open position and the locked position by a manual adjustment.

Figure 22:
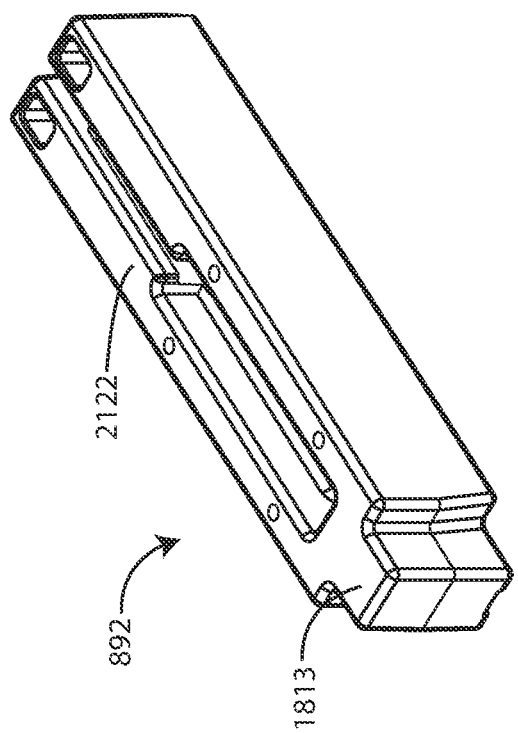
FIG. 22 is a perspective view from the top of a bolt in accordance with various embodiments herein.

Referring now to FIG. 22, a perspective view from the top is shown of a bolt in accordance with various embodiments herein. The features described in FIGS. 22-24 can apply to both the first and second bolts.

In various embodiments, the bolt 892 can comprise a portion 1813 configured to be received by a side bracket 584 and a second portion 2122 configured to be retained by the housing 1814 of a sash tilt bolt assembly 1812. In various embodiments, the portion 1813 and the second portion 2122 are sized to be compatible the side bracket 584 and the housing 1814 respectively. In some embodiments the portion 1813 and the second portion 2122 are substantially rectangular in cross section. In some embodiments, the cross-sectional area of the portion 1813 is smaller than the cross-sectional area of the second portion 2122.

Figure 23:
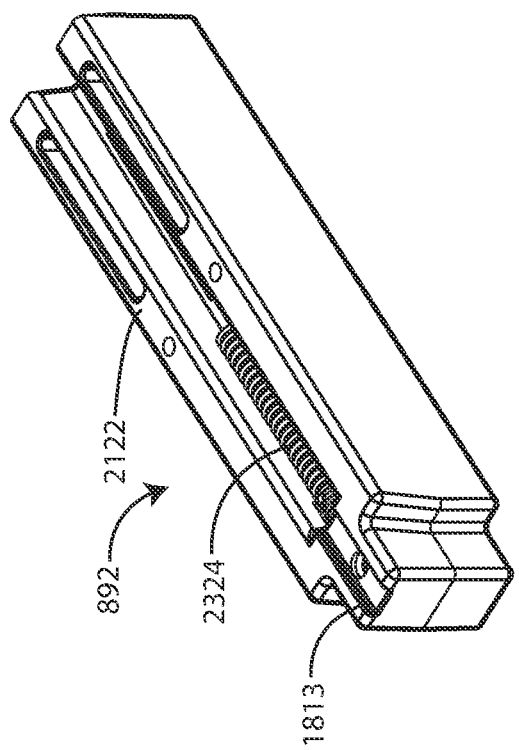
FIG. 23 is a perspective view from the bottom of a bolt in accordance with various embodiments herein.

Referring now to FIG. 23, a perspective view from the bottom is shown of a bolt in accordance with various embodiments herein. As before the bolt can include a portion 1813 and a second portion 2122. The bolt can further include spring 2324. In various embodiments, the spring 2324 is housed within the second portion 1813 of bolt 892.

In various embodiments, the first bolt has a first spring configured to bias the first bolt such that a portion of the first bolt projects outwards from the housing of the first sash tilt bolt assembly, and the second bolt has a second spring configured to bias the second bolt such that a portion of the second bolt projects outwards from the housing of the second sash tilt bolt assembly.

Figure 24:
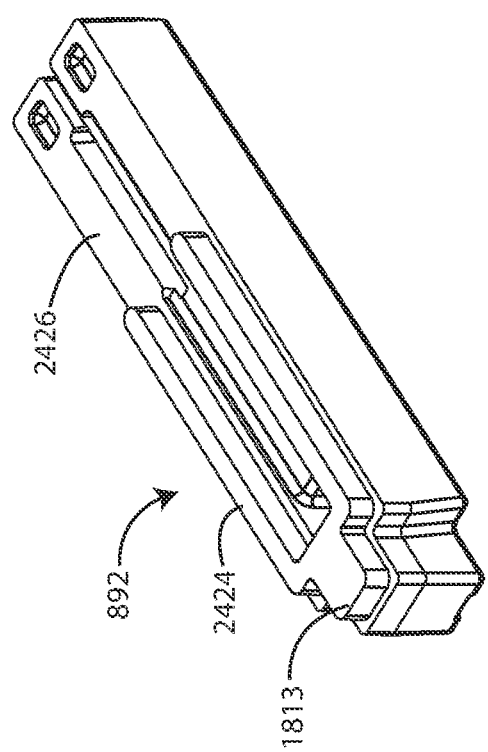
FIG. 24 is a top cut-away view of a bolt in accordance with various embodiments herein.

Referring now to FIG. 24, a top cut-away view of a bolt is shown in accordance with various embodiments herein.

As before the bolt can include a first portion 1813 and a second portion 2122. As depicted in FIG. 24, the top surface of bolt 892 is cut away to show a metal inner support member 2424 and a polymeric overmold portion 2426 (or polymeric shell). However, it is conceivable that the bolt 829 can be constructed from a single material instead of having a multipart construction.

The inner support member 2424 described herein can be formed from various materials. In some embodiments, the inner support member can be formed from a metal. In some embodiments, the inner support member can be formed from a zinc alloy. In some embodiments, side brackets can be formed from Zamak 3.

The polymeric overmold portion 2426 described herein can be formed of various materials. In some embodiments, polymeric overmold portion can be formed from a polyamide, such as NYLON. In some embodiments, polymeric overmold portion can be formed from NYLON 66.

As depicted by FIG. 24, the metal inner support member can define an inner channel of the first and second bolts, but other arrangements of metal and polymer are also contemplated herein.

In various embodiments, the portion of the bolt of the first sash tilt bolt assembly and the portion of the bolt of the second sash tilt bolt assembly received by the cavity of the first and second brackets comprises metal. In other words, the metal inner support member 2424 penetrates into the cavity of the brackets when the bolt is in a closed position. While not intending to be bound by theory, this configuration offers several advantages. The polymeric overmold portion 2426 (or shell portion) allows the bolt to translate within the housing and the cavity of the side bracket with reduced friction and wear to the surfaces. The metal inner support member 2424 interfacing with the side bracket increases the maximum impact force that can be withstood by the impact-resistant fenestration unit without shearing or other damage to the bolt assembly. Performance qualities of the impact-resistant fenestration unit will be discussed in greater detail below.

Figure 25:
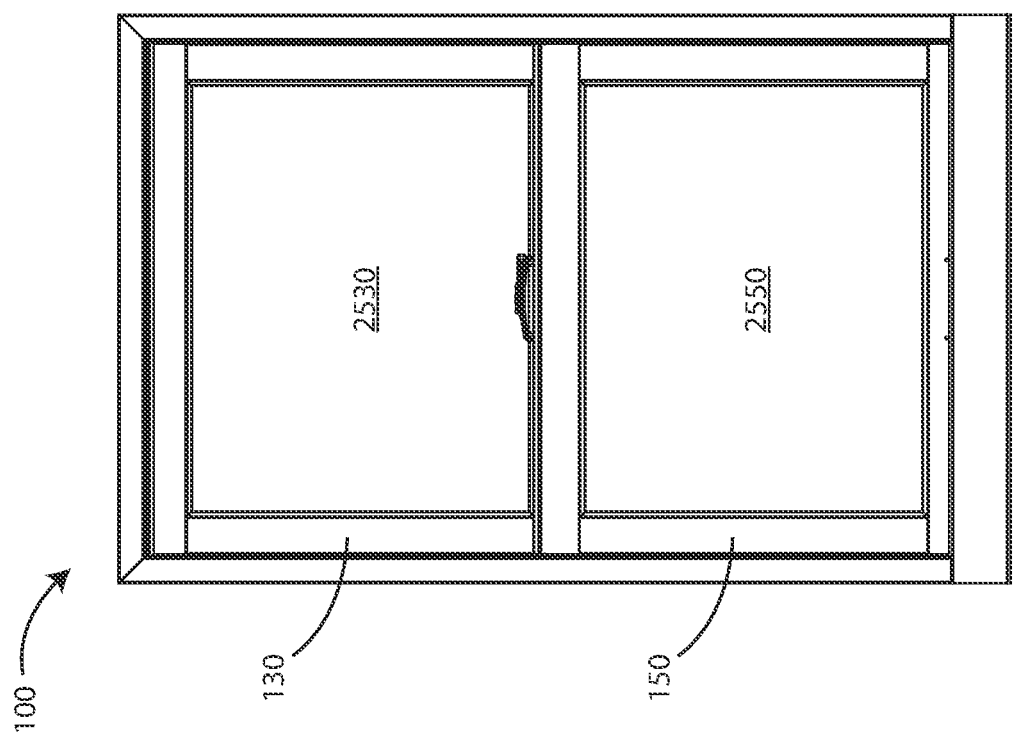
FIG. 25 is an elevation view of an interior side of an impact-resistant fenestration unit in accordance with various embodiments herein.

Embodiments herein can provide high levels of impact resistance while also minimizing or eliminating the visibility (while the fenestration is closed) of hardware components required to achieve the same. As such, embodiments herein can offer desirable sight lines along with remarkable impact resistance. Referring now to FIG. 25, an elevation view is shown of an impact-resistant fenestration unit in accordance with embodiments therein. The impact-resistant fenestration unit 100 is shown as a double-hung unit with a top sash 120 and a bottom sash 140. The top sash 120 includes a transparent central portion 2530 and the bottom sash 140 also includes a transparent central portion 2550. The hardware to provide desirable levels of impact performance is effectively hidden from view. In specific, the side brackets (or check rail brackets) and sash tilt bolt assemblies can be completely hidden from view while the sashes are closed as shown in FIG. 25. In some configurations, the side brackets (or check rail brackets) can also be hidden from view while the sashes are in a fully opened position because sash travel is not far enough to expose the brackets.

Figure 26:
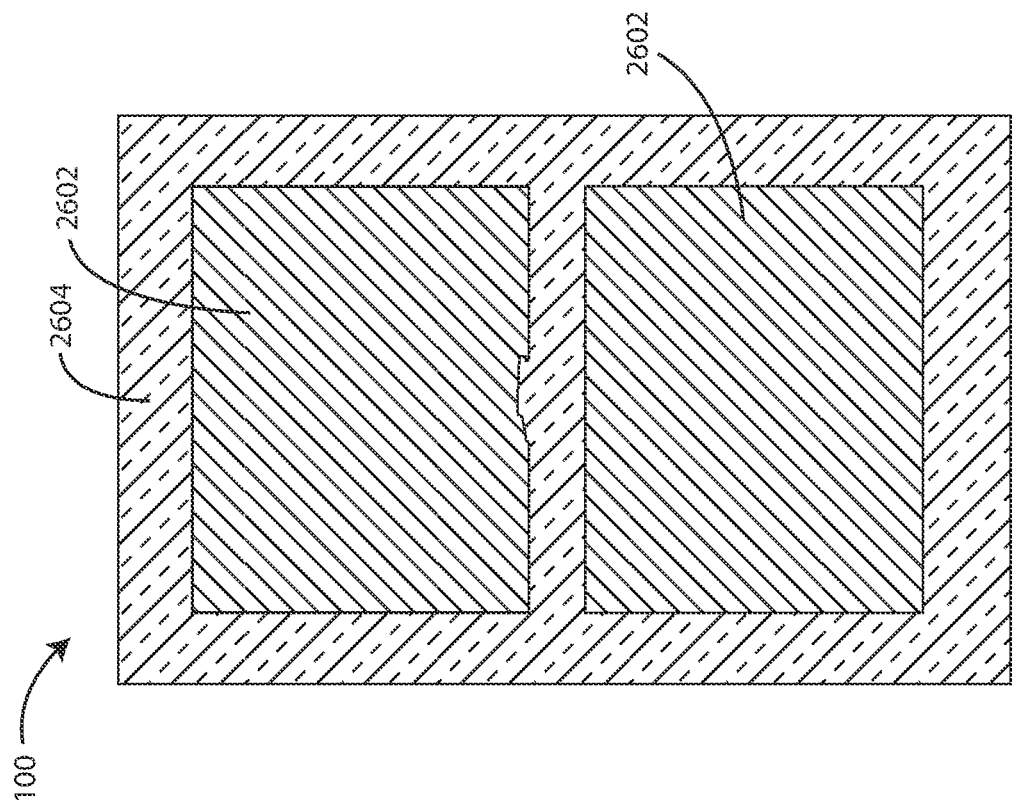
FIG. 26 is a diagram of an interior side of an impact-resistant fenestration unit showing transparent portions thereof in accordance with various embodiments herein.

Embodiments herein can provide high levels of impact resistance while maximizing the area of transparent space relative to the overall area of the fenestration unit. Referring now to FIG. 26, a diagram is shown of an interior side of an impact-resistant fenestration unit showing transparent portions thereof in accordance with various embodiments herein. In specific, the fenestration unit 100 includes transparent areas 2602 (not including any possible grills that might be present) as well as non-transparent area 2604. The proportion of transparent area to the total area of the fenestration (e.g., the sum of both transparent and non-transparent areas) calculated as a percent can be higher than 50%, 55%, 60%, 65%, 70%, 75%, 80%, or more, or an amount falling within a range between any of the foregoing.

Methods

Many different methods are contemplated herein, including, but not limited to, methods of making, methods of using, and the like. Aspects of system/device operation described elsewhere herein can be performed as operations of one or more methods in accordance with various embodiments herein.

Methods

In an embodiment, a method of reinforcing an impact-resistant fenestration unit is included. The method can include an operation of mounting a first sash tilt bolt assembly to a first end of a check rail of a bottom sash. The method can also include an operation of mounting a second sash tilt bolt assembly to a second end of a check rail of a bottom sash. The method can also include an operation of mounting a first side bracket to a first side jamb at a height corresponding to the position of the check rail when the bottom sash is in a closed position. The method can also include an operation of mounting a second side bracket to a second side jamb at a height corresponding to the position of the check rail when the bottom sash is in a closed position. The first and second sash tilt bolt assemblies can each comprise a housing and a spring-loaded bolt disposed therein. The spring-loaded bolts can each comprise a metal inner support member and a polymeric overmold portion.

In an embodiment, the method can further include inserting a fastener through the first side bracket and through a frame assembly of the impact-resistant fenestration unit and into a rough opening surrounding the impact-resistant fenestration unit. The method can also include inserting a fastener through the second side bracket and through the frame assembly of the impact-resistant fenestration unit and into the rough opening surrounding the impact-resistant fenestration unit.

Performance Qualities

Various embodiments herein include impact-resistant fenestration units that can achieve various performance standards. Further details about the performance standards are provided as follows. However, it will be appreciated that this is merely provided by way of example.

In some embodiments, the impact-resistant fenestration unit exhibits impact resistance properties satisfying ASTM E1996-17 and/or Florida TAS Standards. In some embodiments, impact-resistant fenestration units herein can withstand the impact of a large projectile, such as in the ASTM/E1886-19/E1996-17 large missile test or TAS 201 and/or 203 large missile test for High Velocity Hurricane Zone. For example, impact-resistant fenestration units herein can withstand a 2×4 weighing approximately 9 pounds shot from a compressed-air cannon at a velocity of 50 feet per second while maintaining structural integrity (such as no tears in the window permitting a 3 inch sphere to pass through and no tears larger than 5 inches in length or no tears longer than 5 inches and wider than 1/16$^{th}$ of an inch). In some embodiments, impact-resistant fenestration units herein can withstand the impact of a small projectile. For example, impact-resistant fenestration units herein can withstand a ball bearing weighing approximately 2 grams traveling at a velocity of 130 feet per second without allowing penetration of the same. In some embodiments, impact-resistant fenestration units herein can withstand the impact of projectiles according to ASTM E1886-19 missile levels A, B, C, D, and/or E. In some embodiments, impact-resistant fenestration units herein can withstand the impact of projectiles according to ASTM E1886-19 missile levels A and D.

In various embodiments, the impact-resistant fenestration unit exhibits High-Velocity Hurricane Zones (HVHZ) Wind Zone 4 impact resistance properties. In some embodiments, impact-resistant fenestration units herein can withstand HVHZ High-Velocity Hurricane Zones (HVHZ) Wind Zone 4 cyclic pressure differentials. In some embodiments herein, the impact-resistant fenestration unit can satisfy performance requirements as specified in AAMA/WDMA/CSA 101/I.S.2/A440-2017.

In various embodiments, the impact-resistant fenestration unit exhibits exceptional thermal insulation properties. In various embodiments, impact-resistant fenestration units herein exhibit a U factor of less than or equal to 0.50 BTU/h*ft$^2$*° F., less than or equal to 0.45 BTU/h*ft$^2$*° F., less than or equal to 0.40 BTU/h*ft$^2$*° F., less than or equal to 0.35 BTU/h*ft$^2$*° F., or less than or equal to 0.30 BTU/h*ft$^2$*° F.

Lineal Extrusion Materials

Various embodiments herein can be formed with lineal extrusions. For example, sills, jambs, rails, stiles, and the like can be formed from lineal extrusions. Further details about lineal extrusion materials are provided as follows. However, it will be appreciated that this is merely provided by way of example and that further variations are contemplated herein.

In various embodiments, the bottom rail, check rail, and two opposed stiles can be formed from a lineal extrusion that can include a thermoplastic resin. In various embodiments, the sill, side jambs, and top jamb can be formed from a lineal extrusion that can include a thermoplastic resin.

In some embodiments, the portion of thermoplastic resin can include at least 50 percent by weight of the total weight of materials forming the lineal extrusion other than processing aids can be equal to 40, 45, 50, 55, 60, 65, 70, 75, 80, 85, 90, 95, or 100 percent by weight, or can be an amount falling within a range between any of the foregoing. Exemplary thermoplastic resins are described in greater detail below, but in various embodiments, the thermoplastic resin can include polyvinylchloride. In some embodiments, the lineal extrusion can be a composite, such as a composite of thermoplastic resin and glass fibers. For example, in some embodiments at least one of the bottom rail, check rail, and two opposed stiles includes a portion can include a composite including a thermoplastic resin and glass fibers.

In various embodiments, at least one of the bottom rail, check rail, and two opposed stiles includes a portion including a thermoplastic resin, but without glass fibers, along with a portion including a composite including a thermoplastic resin and glass fibers.

In some embodiments, composite materials herein can include a polymeric resin, fibers, and at least one of particles and an impact modifier. Many different specific formulations are contemplated and details of exemplary compositions are described in U.S. patent application Ser. Nos. 15/439,586 and 15/439,603, the content of which is herein incorporated by reference. However, in some embodiments, the composite material can include a polymer resin, fibers, and, in some cases, at least one component selected from the group consisting of at least 1% by weight particles and at least 5 phr impact modifier. However, in other embodiments, the composite material may only include a polymer resin and fiber, lacking particles and/or an impact modifier. Details of these components are described in more detail below.

Some embodiments of composite materials herein have a remarkably high modulus of elasticity. For example, in various embodiments such materials can have a modulus of elasticity of 800,000, 900,000, 1,000,000, 1,100,000, 1,200,000, 1,300,000, 1,400,000, 1,500,000, 1,600,000, 1,700,000, 1,800,000, 1,900,000, 2,000,000, 2,200,000, 2,400,000, 2,600,000, 2,800,000, 3,000,000, 3,500,000 or 4,000,000 psi, or within a range between any of the foregoing. By comparison, some embodiments of composites with the same or similar polymeric resins, but lacking fibers and impact modifier have a modulus of elasticity of about 850,000. By way further comparison, non-composite vinyl (PVC) compositions can have a modulus of elasticity of 300,000 to 500,000 psi. In various embodiments, an extruded article can include a second composition, which can be an advanced composite herein, having a modulus of elasticity at least 50,000 psi higher than a first composition, wherein the second composition is different than the first composition. In some embodiments, the second composition can have a modulus of elasticity at least 100,000, 250,000, 500,000, 750,000, 1,000,000, 1,250,000, 1,500,000, 1,750,000, 2,000,000, or 2,500,000 psi higher than the first composition. In some embodiments, the second composition can have a modulus of elasticity at least 10, 20, 30, 40, 50, 60, 70, 80, 100, 200, 300, 400, 500, 600, 700, or 800 percent higher than the first composition.

Descriptions herein of exemplary particles are only applicable for the description of embodiments herein and not for other patents or patent applications of the applicant and/or inventors unless explicitly stated to the contrary.

Particles herein can include both organic and inorganic particles. Such particles can be roughly spherical, semi-spherical, block-like, flat, needle-like (acicular), plate-like (platy), flake-like (flaky), or other shape forms. Particles herein can have substantial variation. As such, the particles added to compositions in some embodiments can form a heterogeneous mixture of particles. In other embodiments, the particles can be substantially homogeneous.

In some embodiments, the particles used with compositions herein can have an aspect ratio of between about 15:1 and about 1:1. In some embodiments, particles herein can have an aspect ratio of between about 10:1 and about 1:1. In some embodiments, particles herein can have an aspect ratio of between about 8:1 and about 1:1. In some embodiments, particles herein can have an aspect ratio of between about 7:1 and about 1:1. In some embodiments, particles herein can have an aspect ratio of between about 6:1 and about 1:1. In some embodiments, particles herein can have an aspect ratio of between about 5:1 and about 1:1. In some embodiments, particles herein can have an aspect ratio of between about 4:1 and about 1:1. In some embodiments, particles herein can have an aspect ratio of between about 3:1 and about 1:1. In some embodiments, particles herein can have an aspect ratio of between about 2:1 and about 1:1. Such aspect ratios can be assessed by first taking the largest dimension of the particle (major axis) and then comparing it with the next largest dimension of the particle that is perpendicular to the major axis.

In various embodiments, the particles can be, on average, from about 0.01 mm to about 8 mm in their largest dimension (or major axis or characteristic dimension). In various embodiments, the particles can be from about 0.25 mm to about 5 mm in their largest dimension. In various embodiments, the particles can have an average size of about 0.1 mm to about 2.5 mm in their largest dimension. In various embodiments, the particles can have an average size of about 0.18 mm to about 0.6 mm in their largest dimension. In various embodiments, the particles can have an average size of greater than about 0.6 mm in their largest dimension. For example, in various embodiments, the particles can have an average size of about 0.6 mm to about 3.0 mm in their largest dimension. In various embodiments, the particles can have an average size of about 0.5 mm to about 2.5 mm in their largest dimension. In various embodiments, the particles can have an average size of about 1 mm to about 2 mm in their largest dimension.

In some embodiments, the particles can have an average size of their largest dimension falling within a range wherein the lower bound and the upper bound can be any of the following sizes (provided that the upper bound is greater than the lower bound): 0.01 mm, 0.02 mm, 0.03 mm, 0.05 mm, 0.07 mm, 0.09 mm, 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.2 mm, 2.4 mm, 2.6 mm, 2.8 mm, 3.0 mm, 3.5 mm, 4.0 mm, 4.5 mm, 5.0 mm, 5.5 mm, 6.0 mm, 6.5 mm, 7.0 mm, and 8.0 mm.

In some embodiments, the particles are organic particles and can have an average size of their largest dimension falling within a range wherein the lower bound and the upper bound can be any of the following sizes (provided that the upper bound is greater than the lower bound): 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.2 mm, 2.4 mm, 2.6 mm, 2.8 mm, and 3.0 mm.

In some embodiments, the particles are inorganic particles and can have an average size of their largest dimension falling within a range wherein the lower bound and the upper bound can be any of the following sizes (provided that the upper bound is greater than the lower bound): 0.01 mm, 0.02 mm, 0.03 mm, 0.05 mm, 0.07 mm, 0.09 mm, 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.2 mm, 2.4 mm, 2.6 mm, 2.8 mm, and 3.0 mm.

As referenced above, aspect ratios can be assessed by first taking the largest dimension of the particle (major axis) and then comparing it with the next largest dimension of the particle along an axis (Y axis) that is perpendicular to the major axis (X axis). The depth or Z axis measure (Z axis) can be measured along an axis that is perpendicular to both the X and Y axes used to specify the aspect ratio. In some embodiments, particles herein can have an average or maximum depth or Z axis measure in the context of the aspect ratios described above that is equal to at least about 0.1, 0.2, 0.3, 0.4, 0.5, 0.6, 0.7, 0.8, 0.9, or 0.95 of the smaller of the two dimensions used to assess aspect ratio.

It will be appreciated that the dimensions of particles can change during processing steps associated with the creation of extruded articles including, but not limited to, steps of compounding and/or extruding. As such, in some embodiments the foregoing measures of aspect ratio and size can be as measured before such processing steps or as measured after such processing steps.

It will be appreciated that in many embodiments not every particle used will be identical in its dimensions and, as such, the foregoing dimensions can refer to the average (mean) of the particles that are used.

Particles herein can include materials such as polymers, carbon, organic materials, inorganic materials, composites, or the like, and combinations of these. Polymers for the particles can include both thermoset and thermoplastic polymers. Inorganic particle materials can include, but are not limited to silicates. Inorganic particle materials can specifically include, but are not limited to, glass beads, glass bubbles, minerals such as mica and talc, and the like.

Particles herein can specifically include organic particles. Particles herein can specifically include particles comprising substantial portions of lignin, hemicellulose and cellulose (lignocellulosic materials), such as wood particles or wood flour. Wood particles can be derived from hardwoods or softwoods. In various embodiments, the wood particles can have a moisture content of less than about 8, 6, 4, or 2 percent.

In various embodiments, the wood particles can be a heterogeneous mixture of wood particles, wherein at least about 50, 60, 70, 80, 90, or 95 weight percent of the particles are 80 Mesh or larger (or 80 sieve size—corresponding to a pore size of 0.177 mm and a particle size of approximately 0.180 mm).

In various embodiments, the wood particles can be a heterogeneous mixture of wood particles, wherein at least about 50, 60, 70, 80, 90, or 95 weight percent of the particles are 80 Mesh or larger (or 80 sieve size—corresponding to a pore size of 0.177 mm and a particle size of approximately 0.180 mm) and less than 9 Mesh (or 10 sieve size—corresponding to a pore size of 2.00 mm).

In various embodiments, the wood particles can be a heterogeneous mixture of wood particles, wherein at least about 50, 60, 70, 80, 90, or 95 weight percent of the particles are 28 Mesh or larger (or 30 sieve size—corresponding to a pore size of 0.595 mm and a particle size of approximately 0.6 mm).

In various embodiments, the wood particles can be a heterogeneous mixture of wood particles, wherein at least about 50, 60, 70, 80, 90, or 95 weight percent of the particles are 28 Mesh or larger (or 30 sieve size—corresponding to a pore size of 0.595 mm and a particle size of approximately 0.6 mm) and less than 9 Mesh (or 10 sieve size—corresponding to a pore size of 2.00 mm).

Other biomaterials or other organic materials may also be used as particles. As used herein, the term "biomaterial" will refer to materials of biological origin, such as wood fiber, hemp, kenaf, bamboo, rice hulls, and nutshells. More generally, other lignocellulose materials resulting from agricultural crops and their residues may also be used as particles.

In some embodiments, particles herein can include inorganic materials such as metal oxide particles or spheres, glass particles, or other like materials. These particles may be used either alone or in combination with other organic or inorganic particles.

Particles used herein can include newly synthesized or virgin materials as well as recycled or reclaimed materials or portions of recycled materials. In some embodiments, reclaim streams can be from the composition herein or from other extrusion, molding, or pultrusion compositions. As such, in some embodiments particles herein can include portions of multiple materials.

In various embodiments, the particles can be substantially uniformly dispersed within a given extruded composition.

In some embodiments, the particles used herein can include a single particle type in terms of material and dimensions, and in other embodiments can include a mixture of different particle types and/or fiber dimensions. In some embodiments, the particles used herein can include a first particle type and/or size in combination with a second particle type and/or size.

In various embodiments, particles used herein can be coated with a material. By way of example, particles can be coated with a lubricant, a tie layer, or other type of compound.

The amount of the particles used in the composition can vary based on the application. In some embodiments, the amount of particles in the extruded composition with fibers can be greater than or equal to about 1, 2, 4, 6, 8, 10, 15, 20, 25, or 30 wt. % (calculated based on the weight of the particles as a percent of the total weight of the extruded composition in which the particles are disposed). In some embodiments, the amount of particles in the extruded composition with fibers can be less than or equal to about 80, 75, 70, 65, 60, 55, 50, 45, 40, 35, 30, 25, 20, 15, 10, or 5 weight percent. In some embodiments, the amount of particles can be in a range wherein each of the foregoing numbers and serve as the upper or lower bound of the range provided that the upper bound is larger than the lower bound.

The amount of particles in the extruded composition, as measured based on volume, can be greater than or equal to about 1, 2, 3, 4, 5, 6, 7, 8, 9, 10, 12, 14, 16, 18, 20, 22, 24, 26, 28, 30, 32, 34, or 36 percent of the total composition. In some embodiments, the amount of particles as measured based on volume can be in a range wherein any of the foregoing amounts can serve as the upper or lower bound of the range.

It will be appreciated that in some embodiments, some amount of out of specification particles can also be included. As such, in some embodiments, at least 50, 60, 70, 80, 90, 95, or 98 wt. % of the total particle content of the composition are those such the particles described above. For example, in some embodiments at least 50 wt. % of the particles are selected from the group consisting of organic particles having an average largest dimension of greater than 100 microns and an aspect ratio of 4:1 or less and inorganic particles having an average largest dimension of greater than 10 microns and an aspect ratio of 4:1 or less.

In some embodiments, composites herein including fibers can specifically include non-aligned fibers. As used herein, the term "non-aligned" with regard to fiber orientation shall refer to the state of fibers in an extrusion with their lengthwise axis not exhibiting the same degree of alignment (e.g., parallel to) to the direction of extrusion that an otherwise similar composition lacking particles as described herein would assume after going through an extrusion process. Non-aligned fibers can exhibit an average offset angle relative to the extrusion direction of greater than 20 degrees.

As used herein, the term "substantially random" with regard to fiber orientation shall refer to the state of the fibers in an extrusion with their lengthwise axis not being substantially aligned in parallel with the direction of extrusion of the article. The phrase "substantially random" does not require the orientation of the fibers to be completely mathematically random.

Descriptions herein of exemplary fibers are only applicable for the description of embodiments herein and not for other patents or patent applications of the applicant and/or inventors unless explicitly stated to the contrary. Various embodiments of compositions and extrudates herein include a fiber component.

The fiber component can include fibers of various types and in various amounts. Exemplary fibers can include cellulosic and/or lignocellulosic fibers. By way of example, fibers used in embodiments herein can include materials such as glasses, polymers, ceramics, metals, carbon, basalt, composites, or the like, and combinations of these. Exemplary glasses for use as fibers can include, but are not limited to, silicate fibers and, in particular, silica glasses, borosilicate glasses, alumino-silicate glasses, alumino-borosilicate glasses and the like. Exemplary glass fibers can also include those made from A-glass, AR-glass, D-glass, E-glass with boron, E-glass without boron, ECR glass, S-glass, T-glass, R-glass, and variants of all of these. Exemplary glass fibers include 415A-14C glass fibers, commercially available from Owens Corning.

Exemplary polymers for use as fibers can include, but are not limited to, both natural and synthetic polymers. Polymers for fibers can include thermosets as well as thermoplastics with relatively high melt temperatures, such as 210 degrees Celsius or higher.

Natural fibers that can be used in the invention include fibers derived from jute, flax, hemp, ramie, cotton, kapok, coconut, palm leaf, sisal, and others.

Synthetic fibers that can be used in the manufacture of the composites herein include cellulose acetate, acrylic fibers such as acrylonitrile, methylmethacrylate fibers, methylacrylate fibers, and a variety of other basic acrylic materials including homopolymers and copolymers of a variety of acrylic monomers, aramid fibers which comprise polyamides having about 85% or more of amide linkages directly attached to two aromatic rings, nylon fibers, polyvinylidene dinitryl polymers. Polyester including polyethylene terephthlate, polybutylene terephthlate, polyethylene naphthalate, RAYON, polyvinylidene chloride, spandex materials such as known segmented polyurethane thermoplastic elastomers, vinyl alcohol, and modified polyvinyl alcohol polymers and others.

Fibers used herein can include newly synthesized or virgin materials as well as recycled materials or portions of recycled materials.

In some embodiments, the material of the fibers can be organic in nature. In other embodiments, the material of the fibers can be inorganic in nature. Fibers can be carbon fibers, basalt fibers, cellulosic fibers, ligno-cellulosic fibers, silicate fibers, boron fibers, and the like. Exemplary metal fibers that can be used herein can include steel, stainless steel, aluminum, titanium, copper and others.

Fibers used herein can have various tensile strengths. Tensile strength can be measured in various ways, such as in accordance with ASTM D2101. In some embodiments, the tensile strength of fibers used herein can be greater than or equal to about 1000, 1500, 2000, 2500, or 3000 MPa. In some embodiments, the tensile strength of fibers herein can be less than about 5000 MPa.

Fibers herein can include those having various dimensions. Fibers used herein can have an average diameter greater than or equal to about 1, 2, 3, 4, 5, 10, 15, 20, 25, 30, 35, 40, 45, 50, 100, 200, 300, or 500 microns. In some embodiments, fibers used herein can have an average diameter of less than or equal to about 1000, 900, 800, 700, 600, 500, 400, 300, 200, 100, or 50 microns. In various embodiments, the average diameter of fibers used herein can be in a range wherein any of the foregoing diameters can serve as the upper or lower bound of the range, provided that the upper bound is greater than the lower bound. In some embodiments, the average diameter of the fibers used herein can be from 2 microns to 50 microns. In some embodiments, the average diameter of the fibers used herein can be from 10 microns to 20 microns.

Fibers used herein can have an average length of greater than or equal to about 0.1, 0.2, 0.4, 0.6, 0.8, 1, 2, 3, 4, 6, 8, 10, 12, 14, 16, 18, 20, 30, 40, 50, or 100 millimeters in length. In some embodiments, fibers used herein can have an average length of less than or equal to about 150, 100, 90, 80, 70, 60, 50, 40, 30 20, 10, 8, 5, 4, 3, or 2 millimeters. In various embodiments, the average length of fibers used herein can be in a range where any of the foregoing lengths can serve as the upper or lower bound of the range, provided that the upper bound is greater than the lower bound. In some embodiments, the average lengths of the fibers used herein can be from 0.2 millimeters to 10 millimeters. In some embodiments, the average lengths of the fibers used herein can be from 2 millimeters to 8 millimeters. It will be appreciated that fiber breakage typically occurs because of shear forces within the extruder. Therefore, the foregoing lengths can be as measured prior to compounding and/or extruding steps or after compounding and/or extruding steps such as in the finished extrudate.

Fibers herein can also be characterized by their aspect ratio, wherein the aspect ratio is the ratio of the length to the diameter. In some embodiments, fibers herein can include those having an aspect ratio of about 10,000:1 to about 1:1. In some embodiments, fibers herein can include those having an aspect ratio of about 5,000:1 to about 1:1. In some embodiments, fibers herein can include those having an aspect ratio of about 600:1 to about 2:1. In some embodiments, fibers herein can include those having an aspect ratio of about 500:1 to about 4:1. In some embodiments, fibers herein can include those having an aspect ratio of about 400:1 to about 15:1. In some embodiments, fibers herein can include those having an aspect ratio of about 350:1 to about 25:1. In some embodiments, fibers herein can include those having an aspect ratio of about 300:1 to about 50:1.

It will be appreciated that in many embodiments not every fiber used will be identical in its dimensions and, as such, the foregoing dimensions can refer to the average (mean) of the fibers that are used.

It will be appreciated that the dimensions of fibers can change during processing steps associated with the creation of extruded articles including, but not limited to, steps of compounding and/or extruding. As such, in some embodiments the foregoing measures of aspect ratio, length, and diameter can be as measured before such processing steps or as measured after such processing steps.

In some embodiments, the fibers used herein can include a single fiber type in terms of material and dimensions and in other embodiments can include a mixture of different fiber types and/or fiber dimensions. In some embodiments, the fibers used herein can include a first fiber type and/or size in combination with a second fiber type and/or size.

In various embodiments, fibers used herein can be coated with a material. By way of example, fibers can be coated with a lubricant, a tie layer, or other type of compound.

The amount of the fibers used in the composition can vary based on the application. In some embodiments, the amount of fibers in the extruded composition can be greater than or equal to about 2, 4, 6, 8, 10, 15, 20, 25, 30, 40, 50, 60, 70, or even 80 wt. % (calculated based on the weight of the fibers as a percent of the total weight of the extruded composition in which the fibers are disposed). In some embodiments, the amount of fibers in extruded composition can be less than or equal to about 90, 80, 75, 70, 65, 60, 55, 50, 45, 40, 35, 30, 25, 20, or 15 weight percent. In some embodiments, the amount of fibers in the extruded composition can be in a range wherein each of the foregoing numbers can serve as the upper or lower bounds of the range provided that the upper bound is larger than the lower bound.

In various embodiments, the particles can be substantially uniformly dispersed within a given extruded composition.

As used herein, the term "resin" shall refer to the thermoplastic polymer content of the extruded or pultruded composition. The resin portion of the composition excludes any polymer content provided by processing aids.

Polymer resins used with embodiments herein (including "first compositions" and/or "second compositions" herein) can include various types of polymers including, but not limited to, addition polymers, condensation polymers, natural polymers, treated polymers, and thermoplastic resins.

Thermoplastic resins herein can include addition polymers including poly alpha-olefins, polyethylene, polypropylene, poly 4-methyl-pentene-1, ethylene/vinyl copolymers, ethylene vinyl acetate copolymers, ethylene acrylic acid copolymers, ethylene methacrylate copolymers, ethylmethylacrylate copolymers, etc.; thermoplastic propylene polymers such as polypropylene, ethylene-propylene copolymers, etc.; vinyl chloride polymers and copolymers; vinylidene chloride polymers and copolymers; polyvinyl alcohols, acrylic polymers made from acrylic acid, methacrylic acid, methylacrylate, methacrylate, acrylamide and others. Fluorocarbon resins such as polytetrafluoroethylene, polyvinylidiene fluoride, and fluorinated ethylene-propylene resins. Styrene resins such as a polystyrene, alpha-methylstyrene, high impact polystyrene acrylonitrile-butadiene-styrene polymers.

A variety of condensation polymers can also be used in the manufacture of the composites herein including nylon (polyamide) resins such as nylon 6, nylon 66, nylon 10, nylon 11, nylon 12, etc. A variety of polyester materials can be made from dibasic aliphatic and aromatic carboxylic acids and di- or triols. Representative examples include polyethylene-terephthlate, polybutylene terephthlate and others.

Polycarbonates can also be used in the polymeric resin. Such polycarbonates are long chained linear polyesters of carbonic acid and dihydric phenols typically made by reacting phosgene ($COCl_2$) with bisphenol A resulting in transparent, tough, dimensionally stable plastics. A variety of other condensation polymers are used including polyetherimide, polysulfone, polyethersulfone, polybenzazoles, aromatic polysulfones, polyphenylene oxides, polyether ether ketone, and others.

Poly(vinyl chloride) can be used as a homopolymer, but can also be combined with other vinyl monomers in the manufacture of polyvinyl chloride copolymers. Such copolymers can be linear copolymers, branched copolymers, graft copolymers, random copolymers, regular repeating copolymers, block copolymers, etc. Monomers that can be combined with vinyl chloride to form vinyl chloride copolymers include a acrylonitrile; alpha-olefins such as ethylene, propylene, etc.; chlorinated monomers such as vinylidene chloride, chlorinated polyethylene, acrylate monomers such as acrylic acid, methylacrylate, methylmethacrylate, acrylamide, hydroxyethyl acrylate, and others; styrenic monomers such as styrene, alphamethyl styrene, vinyl toluene, etc.; vinyl acetate; and other commonly available ethylenically unsaturated monomer compositions.

In some embodiments, poly(vinyl chloride) polymers having an average molecular weight (Mn) of about 40,000 to about 140,000 (90,000+/−50,000) can be used. In some embodiments, poly(vinyl chloride) polymers having an average molecular weight (Mn) of about 78,000 to about 98,000 (88,000+/−10,000) can be used.

In some embodiments, poly(vinyl chloride) polymers used herein can have an inherent viscosity (IV-ASTM D-5225) of about 0.68 to about 1.09. In some embodiments, poly(vinyl chloride) polymers used herein can have an inherent viscosity of about 0.88 to about 0.92.

In some embodiments, poly(vinyl chloride) polymers used herein can have a glass transition temperature (Tg) of about 70 to about 80 degrees.

Poly(vinyl chloride) polymers are available from many sources under various tradenames including, but not limited to, Oxy Vinyl, Vista 5385 Resin, Shintech SE-950EG and Oxy Vinyl 225G, among others.

In some embodiments, polypropylene having a melt flow rate (g/10 min) (ASTM D1238, 230C) of 0.5 to 75.0 can be used. In some embodiments, polypropylene having a glass transition temperature (Tg) of about 0 to about 20 degrees Celsius can be used.

In some embodiments, polyethylene terephthalate (PET) having an intrinsic viscosity (IV) (Dl/g) of about 0.76 to about 0.9 can be used. In some embodiments, polyethylene terephthalate (PET) having a glass transition temperature (Tg) of about 70 to about 80 degrees Celsius can be used. In some embodiments, glycol modified polyethylene terephthalate (PETG) having a glass transition temperature (Tg) of about 78-82 degrees Celsius can be used.

In some embodiments, polybutylene terephthalate (PBT) having a melt flow rate (g/10 min) (ASTM D1238, 1,2 kg, 250 C) of 100 to 130 can be used. In some embodiments, polybutylene terephthalate (PBT) having a glass transition temperature (Tg) of about 45 to about 85 degrees Celsius can be used.

Polymer blends or polymer alloys can be used herein. Such alloys can include two miscible polymers blended to form a uniform composition. A polymer alloy at equilibrium comprises a mixture of two amorphous polymers existing as a single phase of intimately mixed segments of the two macro molecular components. Miscible amorphous polymers can form glasses upon sufficient cooling and a homogeneous or miscible polymer blend can exhibit a single, composition dependent glass transition temperature (Tg). An immiscible or non-alloyed blend of polymers typically displays two or more glass transition temperatures associated with immiscible polymer phases.

Polymeric resin materials herein can retain sufficient thermoplastic properties to permit melt blending with fiber, to permit formation of extruded articles or other extrudates such as pellets, and to permit the composition material or pellet to be extruded in a thermoplastic process or in conjunction with a pultrusion process.

In some embodiments, polymer resins herein can include extrusion grade polymer resins. In some embodiments, polymer resins herein can include resins other than extrusion grade polymer resins, including, but not limited to, injection molding grade resins. Polymer resins used herein can include non-degradable polymers. Non-degradable polymers can include those that lack hydrolytically labile bonds (such as esters, orthoesters, anhydrides and amides) within the polymeric backbone. Non-degradable polymers can also include those for which degradation is not mediated at least partially by a biological system. In some embodiments, polymers that are otherwise degradable can be made to be non-degradable through the use of stabilizing agents that prevent substantial break down of the polymeric backbone.

Polymer resins herein can include those derived from renewable resources as well as those derived from non-renewable resources. Polymers derived from petroleum are generally considered to be derived from non-renewable resources. However, polymers that can be derived from biomass are generally considered to be derived from renewable resources. Polymer resins can specifically include polyesters (or biopolyesters) derived from renewable resources, including, but not limited to polyhydroxybutyrate, polylactic acid (PLA or polylactide), and the like. Such polymers can be used as homopolymer and/or copolymers including the same as subunits. Polymer resins herein can specifically include extrusion grade polymers.

PLA can be amorphous or crystalline. In certain embodiments, the PLA is a substantially homopolymeric polylactic acid. Such a substantially homopolymeric PLA promotes crystallization. Since lactic acid is a chiral compound, PLA can exist either as PLA-L or PLA-D. As used herein, the term homopolymeric PLA refers to either PLA-L or PLA-D, wherein the monomeric units making up each polymer are all of substantially the same chirality, either L or D. Typically, polymerization of a racemic mixture of L- and D-lactides usually leads to the synthesis of poly-DL-lactide (PDLLA), which is amorphous. In some instances, PLA-L and PLA-D will, when combined, co-crystallize to form stereoisomers, provided that the PLA-L and PLA-D are each substantially homopolymeric, and that, as used herein, PLA containing such stereoisomers is also to be considered homopolymeric. Use of stereospecific catalysts can lead to heterotactic PLA, which has been found to show crystallinity. The degree of crystallinity can be influenced by the ratio of D to L enantiomers used (in particular, greater amount of L relative to D in a PLA material is desired), and to a lesser extent on the type of catalyst used. There are commercially available PLA resins that include, for example, 1-10% D and 90-99% L. Further information about PLA can be found in the book *Poly(Lactic Acid) Synthesis, Structures, Properties, Processing, and Applications*, Wiley Series on Polymer Engineering and Technology (Rafael Auras et al. eds., 2010).

In some embodiments, polylactic acid polymers having number average molecular weights of about 50,000 to 111,000, or weight average molecular weights (Mw) ranging from 100,000 to 210,000, and polydispersity indices (PDI) of 1.9-2 can be used.

In some embodiments, polylactic acid polymers having a melt flow rate (g/10 min) (ASTM D1238, 210 C 2.16 kg) of about 5.0 to about 85 can be used. In some embodiments, polylactic acid polymers having a glass transition temperature (Tg) of about 45 to about 65 degrees Celsius can be used. In some embodiments, polylactic acid polymers having a glass transition temperature (Tg) of about 55 to about 75 degrees Celsius can be used.

Polymers of the polymer resin used herein can have various glass transition temperatures, but in some embodiments glass transition temperatures of at least 120, 130, 140, 150, 160, 170, 180, 190, 200, 220, 240, 260, 280, 300, 320, 340, 360, 380 or 400 degrees Fahrenheit. In some embodiments, polymers having a glass transition temperature of from about 140° F. to about 220° F. can be used.

The polymer resin can make up the largest share of the extruded composition. In some embodiments, the polymer resin is at least about 20, 25, 30, 35, 40, 45, 50, 55, 60, 65, 70, 75, 80, 85, 90, 95, 98, or 99 wt. % of the extruded composition. In some embodiments, the amount of the polymer resin in the composition can be in a range wherein any of the foregoing numbers can serve as the upper or lower bound of the range, provided that the upper bound is larger than the lower bound.

Composite compositions herein (including but not limited to compositions referred to as "second compositions herein") can also include impact modifiers. Impact modifiers can include acrylic impact modifiers. Acrylic impact modifiers can include traditional type acrylic modifiers as well as core-shell type impact modifiers. Exemplary acrylic impact modifiers can include those sold under the tradename DURASTRENGTH, commercially available from Arkema, and PARALOID (including, specifically, KM-X100) commercially available from Dow Chemical.

Impact modifiers can also include various copolymers including, but not limited to, ethylene-vinyl acetate (EVA), acrylonitrile-butadiene-styrene (ABS), methacrylate butadiene styrene (MBS), chlorinated polyethylene (CPE), ethylene-vinyl acetate-carbon monoxide, or ethylene-n-butyl acrylate-carbon monoxide. Exemplary impact modifier copolymers can include those sold under the tradename ELVALOY, commercially available from DuPont.

The amount of impact modifier used can vary in different embodiments. One approach to quantifying the amount of impact modifier used can be with reference to the amount of polymer resin used. As is common in the extrusion art, this type of quantification can be stated as the parts by weight of the component in question per hundred parts by weight of the polymer resin. This can be referred to as "parts per hundred resin" or "phr".

In some embodiments, the composition can include an amount of impact modifier of greater than or equal to 0.1 phr, 0.5 phr, 1 phr, 2 phr, 3 phr, 4 phr, 5 phr, 6 phr, 7 phr, 8 phr, 10 phr, 12.5 phr, 15 phr, or 20 phr. In some embodiments, the composition can include an amount of impact modifier of less than or equal to 40 phr, 35 phr, 30 phr, 27.5 phr, 25 phr, 22.5 phr, 20 phr, 17.5 phr, or 15 phr. In some embodiments, the composition can include an amount of impact modifier in a range wherein any of the foregoing numbers can serve as the lower or upper bounds of the range provided that the lower bound is less than the upper bound.

By way of example, in some embodiments, the composition can include an amount of impact modifier of greater than or equal to 0.1 phr and less than or equal to 40 phr. In some embodiments, the composition can include an amount of impact modifier of greater than or equal to 1.0 phr and less than or equal to 30 phr. In some embodiments, the composition can include an amount of impact modifier of greater than or equal to 1.0 phr and less than or equal to 30 phr. In some embodiments, the composition can include an amount of impact modifier of greater than or equal to 2.0 phr and less than or equal to 25 phr. In some embodiments, the composition can include an amount of impact modifier of greater than or equal to 3.0 phr and less than or equal to 25 phr. In some embodiments, the composition can include an amount of impact modifier of greater than or equal to 4.0 phr and less than or equal to 25 phr.

In some embodiments, the composition can include an amount of impact modifier of greater than or equal to 5 phr and less than or equal to 25 phr. In some embodiments, the composition can include an amount of impact modifier of greater than or equal to 6 phr and less than or equal to 20 phr. In some embodiments, the composition can include an amount of impact modifier of greater than or equal to 7 phr and less than or equal to 20 phr. In some embodiments, the composition can include an amount of impact modifier of greater than or equal to 5 phr and less than or equal to 20 phr. In some embodiments, the composition can include an amount of impact modifier of greater than or equal to 10 phr and less than or equal to 20 phr.

It will be appreciated that various other components can be extruded with compositions herein (first or second compositions) and in some cases can form part of compositions herein. By way of example, process aids can be included in various embodiments.

Examples of process aids include acrylic processing aids, waxes, such as paraffin wax, stearates, such as calcium stearate and glycerol monostearate, and polymeric materials, such as oxidized polyethylene. Various types of stabilizers can also be included herein such as UV stabilizers, lead, tin and mixed metal stabilizers, and the like. It is contemplated that there may be examples wherein satisfactory results may be obtained without one or more of the disclosed additives. Exemplary processing aids can include a process aid that acts as a metal release agent and possible stabilizer available under the trade designation XL-623 (paraffin, montan and fatty acid ester wax mixture) from Amerilubes, LLC of Charlotte, N.C. Calcium stearate is another suitable processing aid that can be used as a lubricant. Typical amounts for such processing aids can range from 0 to 20 wt. % based on the total weight of the composition, depending on the melt characteristics of the formulation that is desired. In some embodiments, the amount of processing aids is from 2 to 14 wt. %. In some embodiments, the amount of processing aids (as measured in parts per hundred resin) can range from 0 to 40 phr, 0.5 to 30 phr, or 0.5 to 20 phr.

Examples of other components that can be included are calcium carbonate, titanium dioxide, pigments, and the like.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. An impact-resistant fenestration unit comprising:
a frame assembly comprising a sill, a head jamb, and two opposed side jambs;
a bottom sash, the bottom sash comprising a bottom rail, a check rail, and opposed stiles; the bottom sash configured to pivot inward away from the frame assembly such that the check rail moves away from the frame assembly; the bottom sash configured to move within the frame between a closed position and an open position;
a first sash tilt bolt assembly comprising a bolt;
a second sash tilt bolt assembly comprising a bolt;
the first and second sash tilt bolt assemblies disposed on opposite sides of the check rail;
a first side bracket defining a cavity to receive a portion of the bolt of the first sash tilt bolt assembly; the first side bracket mounted on one of the two opposed side jambs at a height corresponding to a position of the check rail when the bottom sash is in a closed position; and
a second side bracket defining a cavity to receive a portion of the bolt of the second sash tilt bolt assembly; the second side bracket mounted on the other of the two opposed side jambs at a height corresponding to the position of the check rail when the bottom sash is in a closed position;
wherein the first and second bolts comprise a metal inner support member and a polymeric overmold portion; and
wherein the first and second side brackets are anchored in place each using a fastener that penetrates through the frame assembly into an area outside the frame assembly.

2. The impact-resistant fenestration unit of claim 1, wherein the first side bracket is at least partially embedded within a surface of one of the two opposed side jambs and the second side bracket is at least partially embedded within a surface of the other of the two opposed side jambs.

3. The impact-resistant fenestration unit of claim 1, wherein the first side bracket is mounted flush with a surface of one of the two opposed side jambs and the second side bracket is mounted flush with a surface of the other of the two opposed side jambs.

4. The impact-resistant fenestration unit of claim 1, the bottom sash comprising a glass subassembly and a retention member, the glass subassembly comprising an interior laminate pane and an exterior pane, the retention member engaging at least a portion of the interior laminate pane.

5. The impact-resistant fenestration unit of claim 1, the two opposed side jambs each comprising a channel extending along a vertical axis of each side jamb.

6. The impact-resistant fenestration unit of claim 5, wherein the first side bracket is mounted such that the cavity of the first side bracket is flush with the channel of one of the two opposed side jambs, and the second side bracket is mounted such that the cavity of the second side bracket is flush with the channel of the other of the two opposed side jambs.

7. The impact-resistant fenestration unit of claim 5, wherein the cavity of the first side bracket forms a portion of the channel of one of the two opposed side jambs, and the cavity of the second side bracket forms a portion of the channel of the other of the two opposed side jambs.

8. The impact-resistant fenestration unit of claim 5, wherein a first end of the bottom rail is configured to slide along the channel of one of the two opposed side jambs, and a second end of the bottom rail is configured to slide along the channel of the other of the two opposed side jambs.

9. The impact-resistant fenestration unit of claim 5, wherein the channel is disposed towards an interior side of the impact-resistant fenestration unit.

10. The impact-resistant fenestration unit of claim 1, the two opposed side jambs each comprising a second channel disposed towards an exterior side of the impact-resistant fenestration unit, wherein the first side bracket is fastened into the exterior channel of one of the two opposed side jambs with a first balancer screw, and the second side bracket fastened into the exterior channel of the other of the two opposed side jambs with a second balancer screw.

11. The impact-resistant fenestration unit of claim 1, wherein the first bolt comprises a first spring configured to bias the first bolt such that a portion of the first bolt projects outwards from the housing of the first sash tilt bolt assembly, and wherein the second bolt comprises a second spring configured to bias the second bolt such that a portion of the second bolt projects outwards from the housing of the second sash tilt bolt assembly.

12. The impact-resistant fenestration unit of claim 1, the first and second brackets each comprising a first aperture and a second aperture for receiving a first fastener and a second fastener, wherein the first aperture of the first bracket is at a vertical offset from the first aperture of the second bracket, and wherein the second aperture of the first bracket is at a vertical offset from the second aperture of the second bracket.

13. The impact-resistant fenestration unit of claim 1, the bottom rail, check rail, and two opposed stiles formed from a lineal extrusion comprising a thermoplastic resin.

14. The impact-resistant fenestration unit of claim 1, wherein at least one of the bottom rail, check rail, and two opposed stiles includes a portion comprising a composite including a thermoplastic resin and at least one of particles and glass fibers.

15. The impact-resistant fenestration unit of claim 1, wherein at least one of the first stile, the second stile, the bottom rail, and the check rail comprises an exterior side lineal extrusion and an interior side lineal extrusion.

16. The impact-resistant fenestration unit of claim 1, wherein the first stile of the two opposed stiles and the bottom rail intersect appearing as a mortise and tenon joint, the first stile of the two opposed stiles and the check rail intersect appearing as a mortise and tenon joint, the second stile of the two opposed stiles and the bottom rail intersect appearing as a mortise and tenon joint, and the second stile of the two opposed stiles and the check rail intersect appearing as a mortise and tenon joint.

17. The impact-resistant fenestration unit of claim 1, wherein metal makes up less than 30 percent by weight of the impact-resistant fenestration unit excluding hardware and fasteners.

18. An impact-resistant fenestration unit comprising:
a frame assembly comprising a sill, a head jamb, and two opposed side jambs;
a bottom sash, the bottom sash comprising a bottom rail, a check rail, and opposed stiles; the bottom sash configured to pivot inward away from the frame assembly such that the check rail moves away from the frame assembly; the bottom sash configured to move within the frame between a closed position and an open position;
a first sash tilt bolt assembly comprising a bolt;
a second sash tilt bolt assembly comprising a bolt;

the first and second sash tilt bolt assemblies disposed on opposite sides of the check rail;

a first side bracket defining a cavity to receive a portion of the bolt of the first sash tilt bolt assembly; the first side bracket mounted on one of the two opposed side jambs at a height corresponding to a position of the check rail when the bottom sash is in a closed position; and a second side bracket defining a cavity to receive a portion of the bolt of the second sash tilt bolt assembly; the second side bracket mounted on the other of the two opposed side jambs at a height corresponding to the position of the check rail when the bottom sash is in a closed position;

the two opposed side jambs each comprising a channel extending along a vertical axis of each side jamb, wherein the cavity of the first side bracket forms a portion of the channel of one of the two opposed side jambs, and the cavity of the second side bracket forms a portion of the channel of the other of the two opposed side jambs.

19. An impact-resistant fenestration unit comprising:

a frame assembly comprising a sill, a head jamb, and two opposed side jambs;

a bottom sash, the bottom sash comprising a bottom rail, a check rail, and opposed stiles; the bottom sash configured to pivot inward away from the frame assembly such that the check rail moves away from the frame assembly; the bottom sash configured to move within the frame between a closed position and an open position;

a first sash tilt bolt assembly comprising a bolt;

a second sash tilt bolt assembly comprising a bolt;

the first and second sash tilt bolt assemblies disposed on opposite sides of the check rail;

a first side bracket defining a cavity to receive a portion of the bolt of the first sash tilt bolt assembly; the first side bracket mounted on one of the two opposed side jambs at a height corresponding to a position of the check rail when the bottom sash is in a closed position; and a second side bracket defining a cavity to receive a portion of the bolt of the second sash tilt bolt assembly; the second side bracket mounted on the other of the two opposed side jambs at a height corresponding to the position of the check rail when the bottom sash is in a closed position;

the first and second brackets each comprising a first aperture and a second aperture for receiving a first fastener and a second fastener, wherein the first aperture of the first bracket is at a vertical offset from the first aperture of the second bracket, and wherein the second aperture of the first bracket is at a vertical offset from the second aperture of the second bracket.

* * * * *